United States Patent [19]

Mason et al.

[11] 3,869,569

[45] Mar. 4, 1975

[54] FACSIMILE TRANSCEIVING APPARATUS

[75] Inventors: Peter John Mason; Gary Lee Hutchinson; Lawrence Phillip Lavery; Vernon Edmund Punt, all of Fairport; Roy Wilben Rivers, Conesus, all of N.Y.

[73] Assignee: Xerox Corporation, Rochester, N.Y.

[22] Filed: May 16, 1972

[21] Appl. No.: 253,828

[52] U.S. Cl. .......... 178/7.6, 178/6.6 A, 346/74 ES, 178/DIG. 27

[51] Int. Cl. .......... H04n 3/00

[58] Field of Search .......... 178/6.6 R, 6.6 A, 7.6, 178/DIG. 27; 346/74 ES

[56] References Cited

UNITED STATES PATENTS

| | | | |
|---|---|---|---|
| 2,262,584 | 11/1941 | Herriott | 178/7.6 |
| 3,100,242 | 8/1963 | Hebert | 178/7.6 |
| 3,105,426 | 10/1963 | Bickmore et al. | 346/74 ES |
| 3,160,746 | 12/1964 | Clark | 346/74 ES |
| 3,316,348 | 4/1967 | Hufnagel et al. | 178/7.6 |
| 3,426,144 | 2/1969 | Roth | 178/6.6 A |
| 3,445,598 | 5/1969 | Green et al. | 178/DIG. 3 |
| 3,472,953 | 10/1969 | Montevecchio | 178/6.8 |
| 3,588,335 | 6/1971 | Harris et al. | 178/7.6 |
| 3,638,232 | 1/1972 | McMahon et al. | 178/6.6 A |
| 3,686,676 | 8/1972 | Howell et al. | 346/74 ES |
| 3,707,601 | 12/1972 | Goble | 178/7.6 |
| 3,750,189 | 7/1973 | Fleischer | 346/74 ES |

OTHER PUBLICATIONS

Glasford - Fund of TV Engineering - McGraw Hill - 1955, page 480-481.

Medley - Development of Electrostatic Images - IBM Tech. Discl. Bulletin, Vol. 2, Number 2, Aug. 1959, pp. 4 and 5.

*Primary Examiner*—Richard Murray

[57] ABSTRACT

A facsimile transceiver apparatus is described which includes means for advancing a document to a station at which location the document is line scanned by a laser light beam. A video signal thus formed is transmitted to a remote facsimile apparatus for reproduction of the document. The transceiver further includes an electrostatographic printing station at which station a latent electrostatic image is formed by line scanning a laser light beam over a uniformly charged photoreceptor surface. A means for line scanning at the document scanning station and at the photoreceptor surface includes a laser light source and means for alternatively sweeping the laser light beam across the document at the scanning station or across a charged image retention surface at the printing station. Means are also described for enhancing document feed, resolution, and speed of reproduction.

19 Claims, 24 Drawing Figures

PATENTED MAR 4 1975

3,869,569

SHEET 02 OF 15

Fig. 9
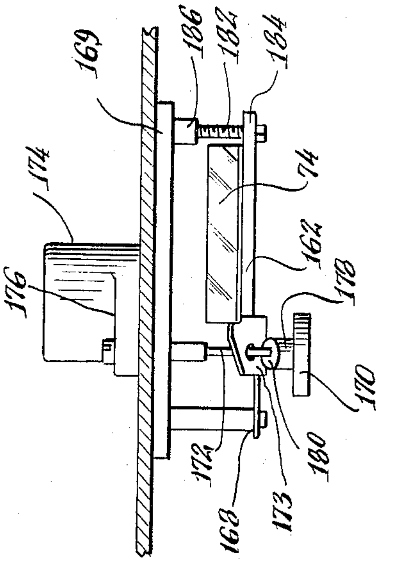
Fig. 21A.
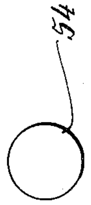
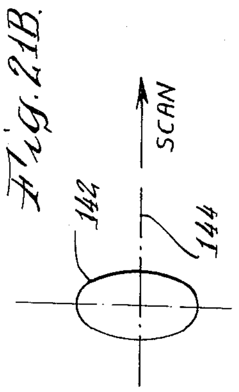
Fig. 22.
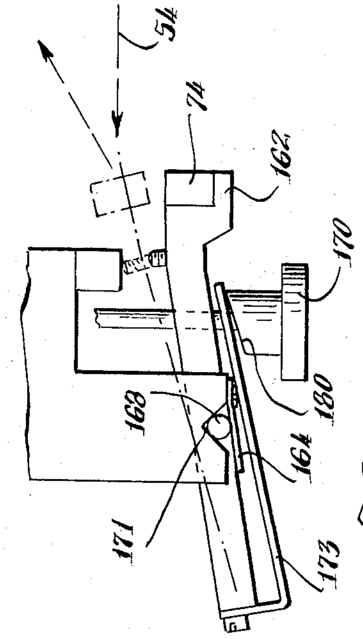
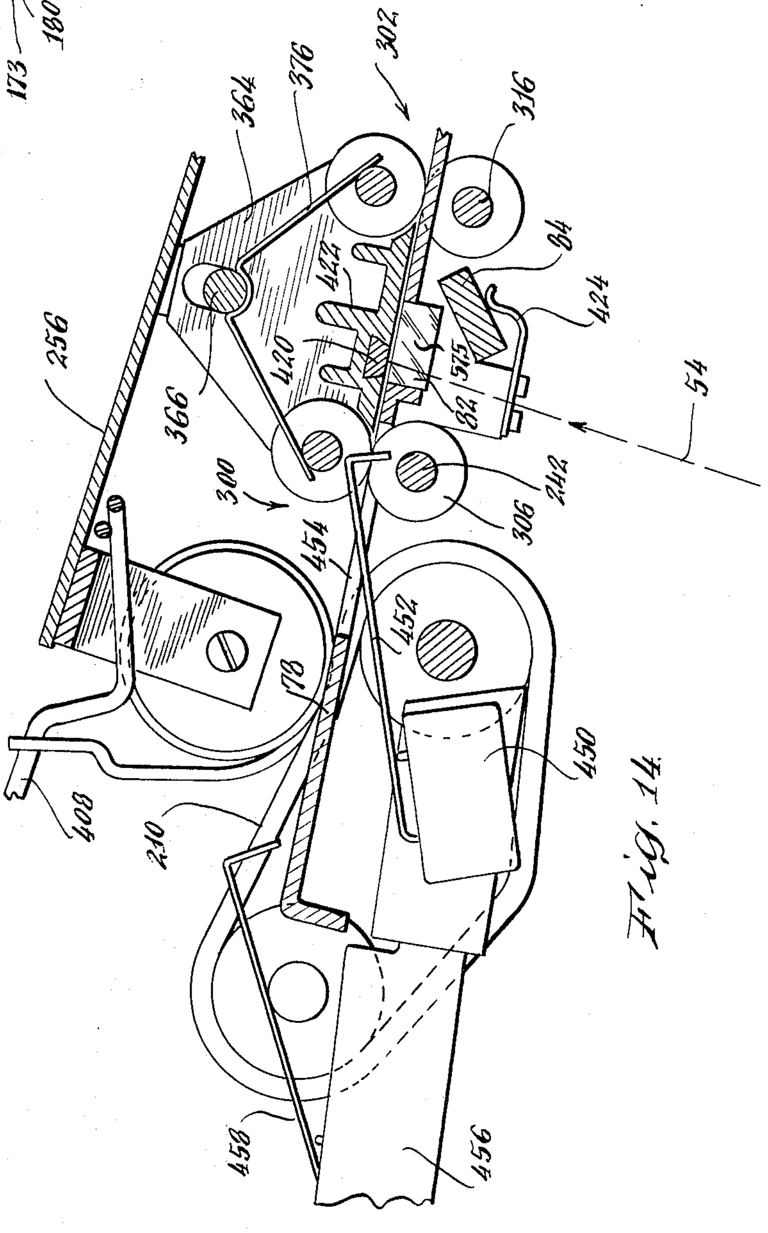

FACSIMILE TRANSCEIVING APPARATUS

This invention relates to facsimile transceiving apparatus. The invention relates more particularly to improvements to facsimile transceiving apparatus for enhancing the operation of such apparatus in both the transmitting and receiving modes.

Facsimile systems are known wherein graphic material including typewritten copy and pictorial information are converted into electrical signals and transmitted to a distant receiving station. These signals are generally reconverted to graphic form at the receiving station on a sensitized recording material.

Facsimile systems of this type exhibit various limitations which detract from the overall quality of the reproduced copy. More particularly, the copy is generally produced at the receiving station by a printing means which operates by electrostatic discharge or through the application of heat to sensitized paper. While this form of printing has produced acceptable copy, it nonetheless suffers from the requirement for the use of a sensitized paper which is subject to variations in quality and uniformity during its production. The scanning and printing by an electrostatic discharge to the copy paper or the heating of the copy paper results in the reproduction of graphic material on a surface which generally provides less contrast than is desirable.

Accordingly, it is an object of this invention to provide an improved form of facsimile transceiving apparatus.

Another object of the invention is to provide a facsimile transceiving apparatus which is adapted for reproducing a copy with electrostatographic techniques.

Another object of the invention is to provide an improved facsimile transceiving apparatus utilizing electrostatographic printing techniques and a coherent light source for imaging a photoreceptor surface.

Another object of the invention is to provide an improved facsimile transceiving apparatus which is adapted for generating a video signal by scanning with a coherent light beam a document which is to be transmitted.

Another object of the invention is to provide an improved facsimile transceiving apparatus having a scanning laser light beam which scans a document to be transmitted in a transmitting mode and alternatively images a surface in a receiving mode of operation.

Another object of the invention is to provide in a facsimile apparatus a scanning laser light beam having a cross sectional area and form which is modified for enhancing resolution.

A further object of the invention is to provide a facsimile transceiving apparatus employing electrostatographic printing techniques having means for reproducing images at different rates and for speeding up the processing after forming and developing an image on a photoreceptor surface.

A further object of the invention is to provide a facsimile transceiving apparatus employing electrostatographic printing techniques and having means for establishing a uniform charge on a photoreceptor surface which is transported at different rates.

Another object of the invention is to provide a facsimile transceiving apparatus having an improved means for document handling.

Another object of the invention is to provide a facsimile transceiving apparatus having an improved means for bottom feeding a document which is to be transmitted from a stack of documents.

A further object of the invention is to provide a bottom feeding document handling apparatus of improved reliability.

In accordance with the general features of this invention, a facsimile transmission apparatus includes means for advancing a document which is to be transmitted and reproduced past a line scanning station at which station the document is line scanned by a light beam and a video signal is formed for transmission to a remote facsimile apparatus for reproduction. The transceiver apparatus further includes an electrostatographic printing station including means for forming an electrostatographic image, for developing the image, and for transferring the developed image to a record medium. The image formation means includes a line scanning laser light beam.

In accordance with more particular features of the invention, a line scanning laser light means includes a laser for supplying a substantially collimated, coherent light beam, together with a deflection system for selectively deflecting the light beam across the document at the scanning station in a direction generally transverse to the motion of the transported document or across a charged image retention surface at the printing station. A beam shaping means is provided for altering the cross sectional configuration of the generated laser light beam in order to provide a smaller cross sectional configuration which is narrowed further in the direction in which the laser light beam os def;ected.

The transceiving apparatus includes means for varying the rate at which a photoreceptor surface at the printing station is advanced in order to provide compatible operation of the transceiver in a printing mode with transceivers adapted to operate at different scanning rates and to speed up the image transfer subsequent to the formation and development of a latent electrostatic image. The charging means at the printing station is adapted to establish a uniform electrostatic charge on the image retention surface at the different printing rates. These and other objects and features of the invention will become apparent with reference to the following specification and to the drawings wherein:

FIG. 9 is a view taken along lines 9—9 of FIG. 5;

FIG. 14 is an enlarged view of a portion of the document feeding and document transport arrangement shown in FIG. 10;

FIG. 21A and 21B illustrate cross sectional configurations of a laser light beam;

FIG. 22 is a view of a scan print mirror and support; and,

Figure 1:
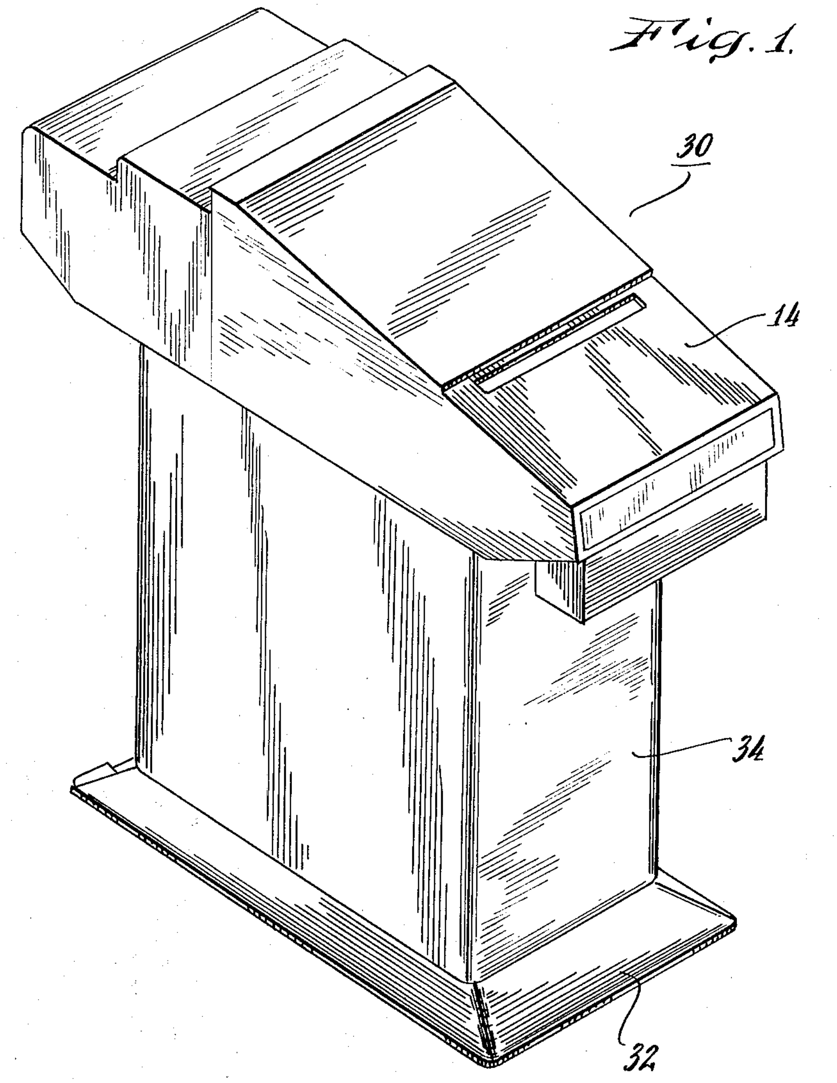
FIG. 1 is a perspective view of a transceiving apparatus constructed in accordance with features of this invention.

Referring now to the drawings, there is illustrated in FIG. 1 a transceiving apparatus 30 constructed in accordance with features of this invention. The transceiving apparatus is supported on a base 32 by a pedestal member 34. A plate 36 (FIG. 2), which is mounted on the pedestal 34 supports an electrostatographic printing means at a printing station referenced generally as 38 and a document feeding means located at a feeding and scanning station referenced generally as 40. A light scanning means for scanning a document at the station 40 in order to generate a video signal representative of document information for transmission to a remote receiving transceiver is provided. This light scanning means, which is adapted for alternatively scanning an electrostatographic surface at the printing station 38 in order to form an image thereon, is mounted from a lower surface of the plate 36 and is referenced generally as 42. A conventional power supply means is provided and is indicated as 44. The transceiving apparatus thus far described provides a signalling format for communicating with a remote transceiver which enhances the transmission rate at which data is communicated to the remote transceiver. The details of this signalling format as well as the circuit arrangements for accomplishing transmission of data between two transceivers is disclosed in a copending U.S. Pat. application Ser. No. 253,827 which is filed May 16, 1972 and assigned to the assignee of this invention. The following description of the transceiving apparatus will describe in order the light scanning means 42, the document feeding means 40, and the electrostatographic printing means 38.

Figure 4:
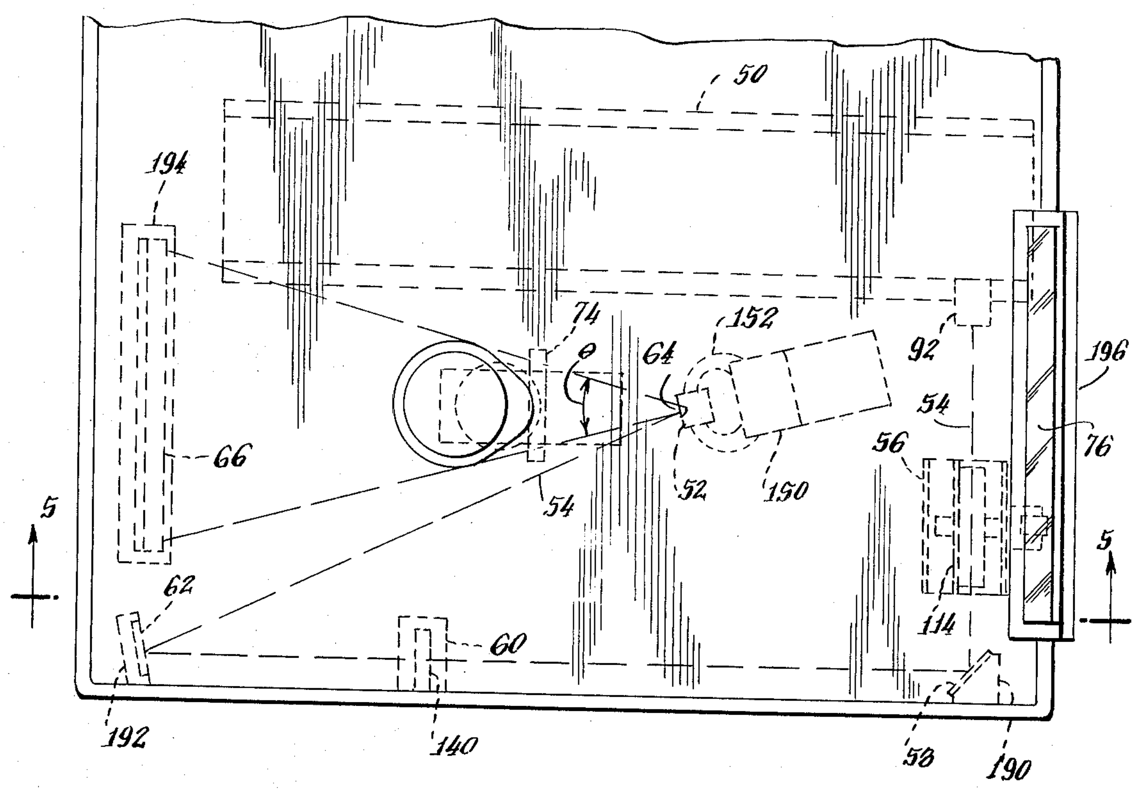
FIG. 4 is a view taken along lines 4—4 of FIG. 2 and illustrating a laser light source and optical projection system employed with the apparatus.
Figure 5:
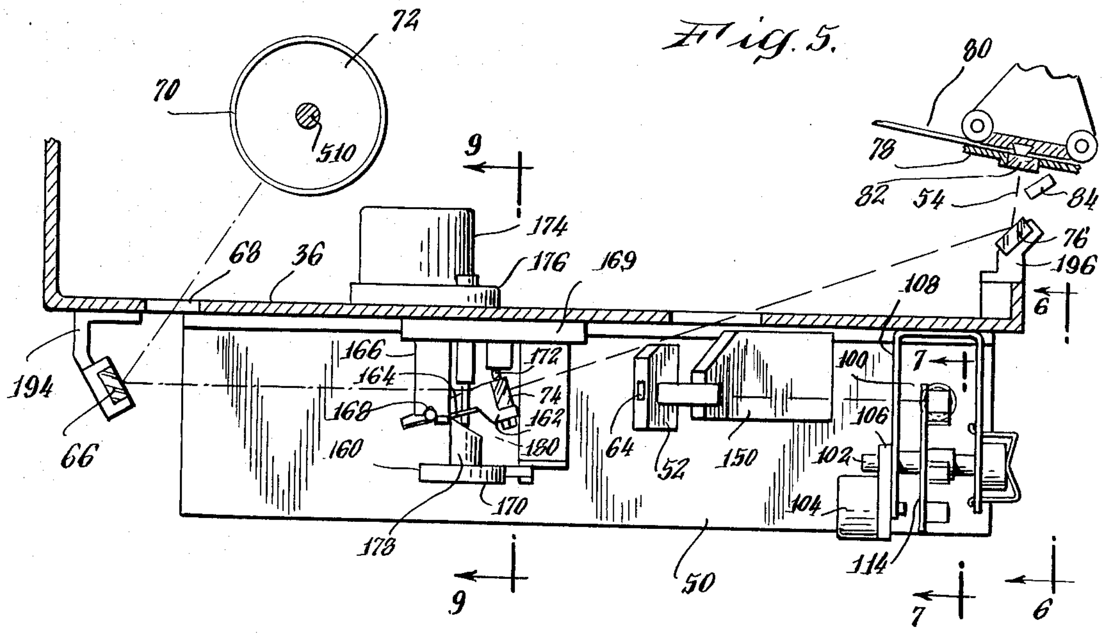
FIG. 5 is a sectional view taken along lines 5—5 of FIG. 4.
Figure 6:
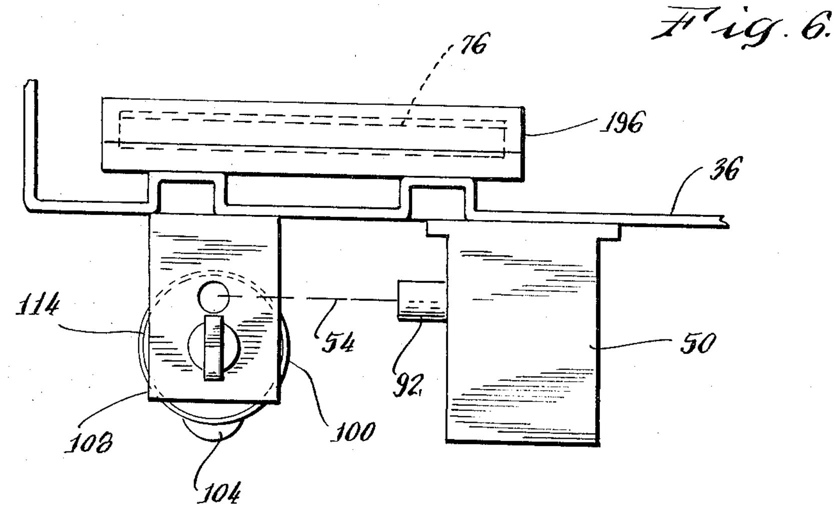
FIG. 6 is a view taken along lines 6—6 of FIG. 5.

The light scanning means 42 shown in detail in FIGS. 4–9 includes a source of coherent light comprising a laser 50 and a light beam scanning galvanometer 52. As illustrated in FIGS. 4 and 5, a laser light beam 54 is projected through a light beam intensity filtering arrangement 56 toward a reflective surface 58. The surface 58 reflects the light beam 54 through a lens arrangement 60 and toward a reflective surface 62. The beam 54 which then impinges upon the surface 62 is again reflected toward a reflective surface 64 of the galvanometer 52. The surface 64 is mounted to a movable coil of the galvanometer 52 and is adapted for movement therewith. As the coil and the surface 64 are deflected through a predetermined arc and while the transceiver is operating in a printing mode, the light beam 54 reflected from the surface 64 is scanned across a printing reflective surface 66. The beam 54 is again reflected from surface 66 and projected through a slot 68 (FIG. 5) in the plate 36 toward a photoreceptor surface formed on an outer surface of a drum 70.

In an alternative mode of operation, a reflective surface 74 is positioned to intercept the light beam reflected from the surface 64. The beam 54 is then reflected by the intercepting surface 74 toward a scanning reflective surface 76. The beam 54 which is reflected from the surface 76 is projected toward a platen plate 78 upon which a document 80 is transported. A scanning station is formed by a slot in the platen within which a transparent body 82 comprising glass, for example, is mounted. The beam which impinges upon the reflective surface 76 is deflected along the scanning surface 76 and toward the document at the scanning station as the galvanometer mirror is deflected. Light which is diffusely reflected from the document 80 during this scanning process is intercepted by a photodetector 84 and electrical signals representative of the information contained in the document are generated. These signals are transmitted to a remote transceiver for reproduction of the document.

The laser 50 is shown to have a generally rectangular shaped housing and is mounted from a lower surface of the plate 36. The housing includes a shaded outlet aperture 92 through which the beam 54 emerges from the housing. The laser comprises a relatively low power helium-neon laser which produces a generally red colored laser light beam. The output beam 54 has a generally circular cross section of about 3.52 mm and a power level of on the order of about 0.8 milliwatts. Because the laser is utilized for generating an analog signal having an amplitude that is representative of data contained on the document being scanned and since the laser light beam is utilized for scanning and exposing a photoreceptor in image reproduction, the power level of the laser is required to be relatively closely controlled. A laser power level control arrangement which satisfies this need is described and claimed in a copending U.S. Pat. application Ser. No. 239,144 which was filed on Mar. 29, 1972 and which is assigned to the assignee of the present invention.

As indicated hereinbefore, the transceiving apparatus is adapted for operating at differing sweep rates. The transceiving apparatus may operate at a scanning rate which provides for the transmission of an 8 ½ × 11 inch sheet at a rate of 1 sheet in 6, 4, 3 or 2 minutes or at a rate of one-fourth minute for relatively rapid feed. Without more, of course, there would be unwanted variations in the exposure of the photoreceptor surface carried by the drum 70 because the energy level of the beam 54 emitted by the laser 50 is independent of the scanning rate selected. However, a filtering means is provided for selectively reducing the intensity of the scanning laser light beam in order to provide substantially uniform exposure at the different scanning rates. The filtering means includes a turret 100 which is mounted on a drive shaft 102 for rotation therewith. The drive shaft 102 is driven by an electric motor 104 through gear reduction means 106. The motor and turret are supported by a U-shaped bracket 108 which is mounted to a lower surface of the plate 36. A rotary switch on the other end of the shaft senses that the proper filter has been positioned in laser beam path.

Figure 8:
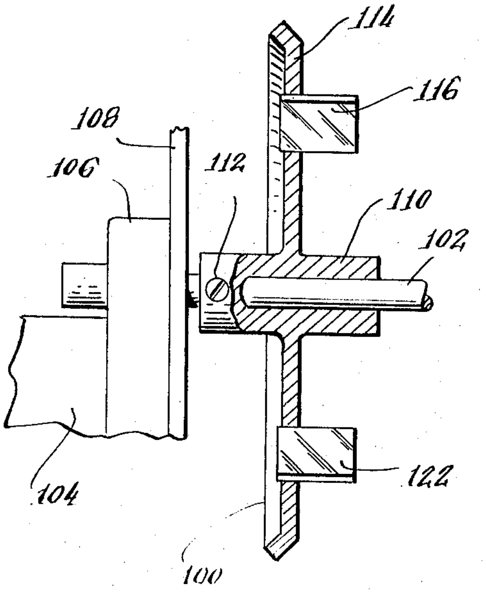
FIG. 8 is a sectional view taken along lines 8—8 of FIG. 7.
Figure 7:
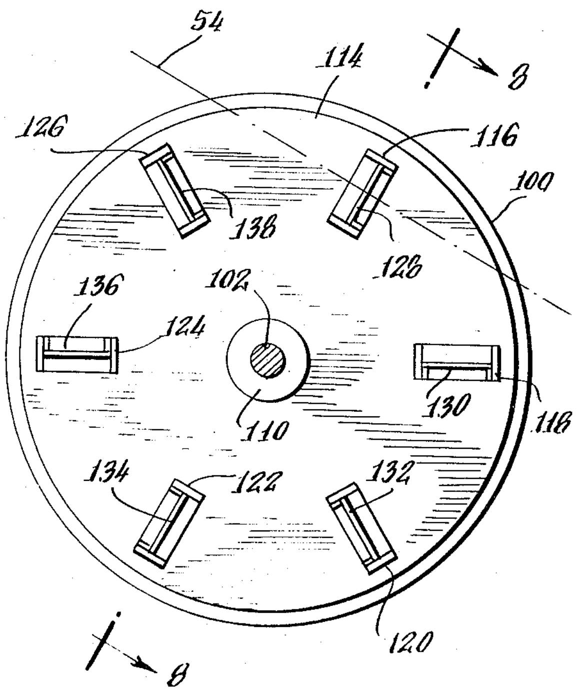
FIG. 7 is a sectional view taken along lines 7—7 of FIG. 5.

The turrent 100 which is shown in greater detail in FIGS. 7 and 8 is formed of plastic for example and includes a centrally located hub segment 110 through which the drive shaft 102 extends and to which the hub 110 is secured by a set screw 112. The turret 100 further includes a generally planar shaped surface 114 which extends uniformly from the hub and upon which a plurality of filter mounting bosses 116–126 are supported. The bosses 116–126 are spaced at uniform angular intervals about the surface 114 and are each adapted to receive a filtering element 128–138 respectively. The filtering elements exhibit differing laser light beam intensity transmission characteristics. In a printing mode of operation, one of the filter elements will be positioned in the path of the laser light beam 54. Thus by selectively energizing the motor 104 by means of the rotary switch, the turret 100 is rotated to provide at the filtering station a filter element which transmits a laser light beam having an intensity which, when scanned across the photoreceptor surface at a predetermined scanning rate, will provide a uniform exposure characteristic with respect to the light beam which is transmitted through other filter elements for scanning at different rates. A relatively uniform exposure of the photoreceptor surface is thereby provided. When operating in a document scanning mode, intensity attenuation is not employed. A filter element is therefore eliminated from one of the bosses for this mode of operation or the element is adapted for providing substantially unattenuated transmission. The motor 104 is energized in accordance with signalling information which is received and detected by the transceiving appartus. An electrical receiving means for receiving and detecting this data is described in the hereinbefore referred to concurrently filed copending U.S. Pat. application Ser. No. 253,827.

The resolution of the reproduced image is enhanced by scanning the document being transmitted and the photoreceptor surface with a light beam having a relative narrow cross sectional configuration. The laser 50 provides an output light beam having a generally circular configuration of approximately 3.52 mm. in diameter. In order to enhance the resolution provided by this scanning light beam, the cross sectional configuration of the laser light beam is reduced in size and altered for providing a laser light beam which is narrower in the direction of beam scanning than in a direction transverse to the direction of scanning. This is accomplished by transmitting the beam 54 through an anamorphic lens arrangement. A typical anamorphic lens for accomplishing the desired beam shaping comprises a lens assembly having two focal lengths in 90° opposed planes. The focal planes for example, are 34 inches and 37 inches for a laser of the type described hereinbefore. The lens assembly 140 (FIG. 4) is supported in a mount 60 in the path of the laser light beam 54. The mount 60 is secured to a lower surface of the plate 36. FIG. 21A illustrates the generally circular cross sectional configuration of the light beam 54 which impinges upon the lens array, while FIG. 21B illustrates the cross sectional configuration of the light beam formed by the lens array at the image plane. FIG. 21B illustrates a major elliptical axis 142 and a minor elliptical axis 144 which extends in the direction of scanning.

The galvanometer 52 which provides scanning of the laser light beam 54 is supported from a lower surface of the plate 36 by a support bracket 150 and a horseshoe magnet 152. The galvanometer is of the moving coil type including a coil, not illustrated, which is energized by a current having a waveform including ramp shaped segments and retrace segments. The galvanometer reflective surface 64 comprises a flat mirror which is mounted on the coil which is secured within the galvanometer 52. A current which, in turn, is applied to the galvanometer coil causes the mirror to deflect the impinging light beam through the angle $\theta$. It is important to maintain the oscillatory angle $\theta$ and the time duration of deflection and flyback period of the mirror 64 constant so that the scanning operation is properly synchronized with scanning at a remote transceiver. This is accomplished by a digital converter of a type described in detail in copending U.S. patent application Ser. No. 227,999 filed on Feb. 22, 1972 and which is assigned to the assignee of the present invention. In addition, the movement of the galvanometer is required to be damped in order to correct for undamped oscillation thereof. In prior arrangements, the damping means have tended to underdamp or critically damp the movement. When the movement is critically damped or overdamped the deflection of the moving element becomes relatively slow and generally unsatisfactory inasmuch as relatively fast deflection rates are required. When the movment is underdamped, undesirable oscillations occur. A feedback correction circuit is described in copending U.S. patent application Ser. No. 227,038 filed Feb. 22, 1972, abandoned in favor of continuing application Ser. No. 402,541, filed Oct. 1, 1973, and which is assigned to the assignee of this invention. This correction circuit provides for a relatively fast deflection of the movement while avoiding undamped oscillation thereof.

A feature of the present invention is the utilization of a same scanning laser light source for both scanning a document in a transmitting mode of operation and for imaging a photoreceptor surface during a receiving or printing mode of operation of the apparatus. To this end, means are provided for selectively transmitting the beam toward a scanning station for scanning the document being transmitted or toward a printing station for imaging a photoreceptor surface. This means 160 includes the elongated mirror 74 which is supported by a metal strip 162 and is rotatably mounted to a mount 166 extending from a lower surface of a mounting plate 169 which is secured to the plate 36. A pin 168 is secured to the strip 162 in a notch 171 on the mount. The pin 168 is rotatably mounted in the notch by a spring clip 164. A resilient spring strip 173 is secured to a rear surface of the strip 162 and extends below the strip along a portion of its length.

A means is provided for adjusting the position of the mirror 74 in the document scanning mode of operation. In a first position as illustrated in FIG. 5 corresponding to a document scanning mode of operation, the mirror is positioned at an upper location in the path of the laser light beam. The mirror 74 thus intercepts this beam and causes it to reflect toward the scanning mirror strip 76. In a second relatively lower position, as illustrated in FIG. 22, the mirror is positioned out of the path of the beam 54 and the beam 54 is thus projected toward the printing mirror strip 66. A cam body 170 (FIG. 9) is secured to a drive shaft 172 for rotation therewith. The drive shaft 172 is mechanically coupled to a motor 174 through a gear box 176. Energization of the motor will result in rotating the cam 170 to either of two diametrically opposite positions. The cam 170 supports a stud 178 having a sloping surface 180 terminating in an upper edge which contacts the resilient body 173 during a scanning mode of operation and causes the mirror 74 to be raised to an upper location where it intercepts and reflects the laser light beam toward the mirror 76. When, however, the cam 170 is rotated to a second diametrically opposite position, the upper edge of the surface 180 is rotated and the resilient body 173 which then descends to the location as illustrated in FIG. 22. At this location, the mirror 74 is positioned out of the path of the light beam 54 which is then projected to the printer scanning mirror 66.

A means is provided for adjusting the position of the reflective mirror 74 in the document scanning position. This means comprises a screw 182 (FIG. 9) which extends through and engages a threaded aperture 184 which is formed in the mirror support plate 162. One end of the screw 182 abuts a stop member 186 which is mounted to and extends from the support plate 169. Rotation of the screw 182 limit the maximum distance which the mirror support 162 and thus the mirror can travel in a vertical directin after being contacted by the upper edge of the sloping surface 180. Rotation of the screw 182 provides for accurate adjustment of the mirror 74 causing accurate projection of the light beam 54 toward the mirror 76 and the scanning station.

The reflective surfaces 58, 62, 66 and 76 referred to hereinbefore comprise plane mirrors which are supported by support brackets 190, 192, 194 and 196 respectively. Each of the brackets 190, 192, and 194 is secured to the bottom of the plate 36. The suport members are arranged for positioning the surfaces of the mirrors in the path of the light beam for causing the desired reflection. For example, the bracket 190 supports the mirror 58 for providing a 90+ change in path of projection of the beam 54. The bracket 192 supports the mirror 62 at an angle for causing an approximately 150° change in the direction of projection. The bracket 194 supports the mirror 66 for providing a vertical reflecting of about 60°. Similarly, the bracket 196 provides for positioning the mirror 76 in order to establish a change in projection of about 100°. The mirrors are secured to the mounts by conventional means such as an adhesive backing or other.

Figure 2:
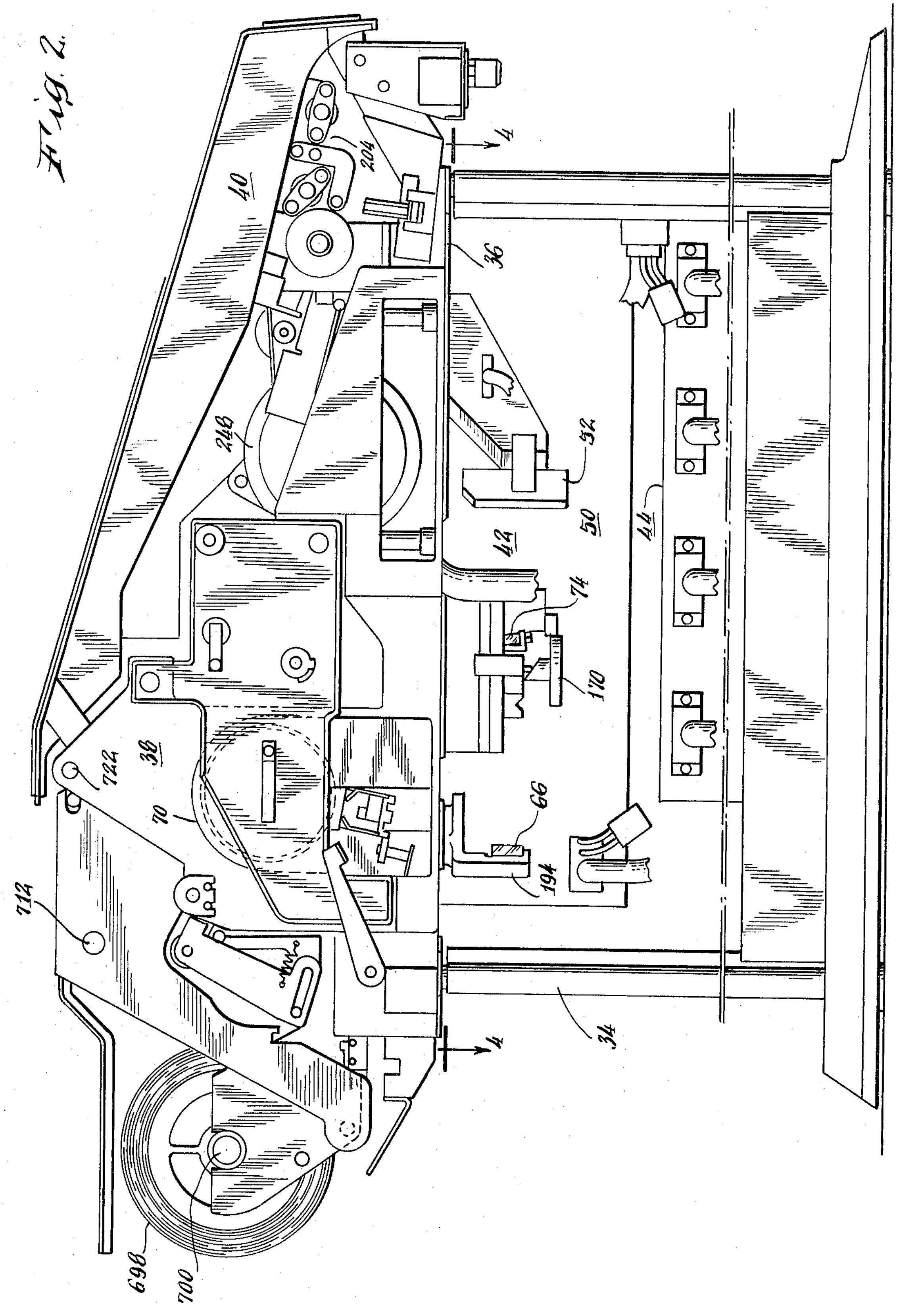
FIG. 2 is a side elevation view of the transceiving apparatus of FIG. 1 with its housing partly cut away in order to illustrate the general arrangement of components of the apparatus.

The document transport and scanning station 40 of FIG. 2 is illustrated in greater detail in FIGS. 10–14. Included in the document feeding and scanning station is a feeding means 200 (FIG. 13) for bottom feeding a document from a stack of documents and a document transport means 204 (FIG. 10) for transporting a document past a scanning station and for discharging the scanned document into a receptacle. In addition, there is located in relatively close proximity to the scanning station an elongated photodetector 84 (FIG. 5) toward which a portion of the laser light beam is diffusely reflected from the document for generating a video signal.

Figures 10, 13:
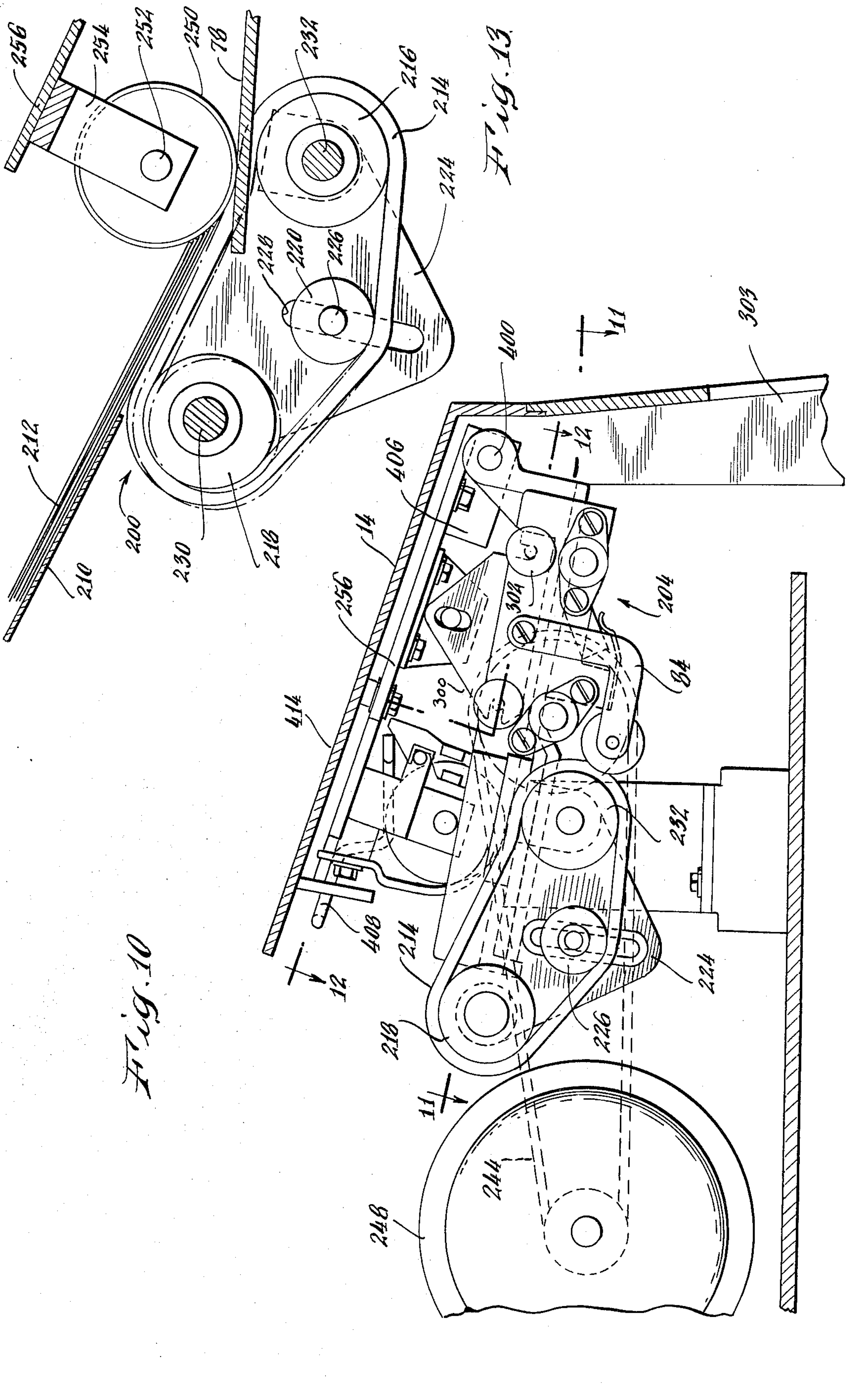
FIG. 10 is an enlarged view of a portion of a document feeding station of the apparatus of FIG. 2.
FIG. 13 is an enlarged view of the bottom feeding document supply mechanism shown in FIG. 10.

The document feeding means 200 includes a document supply tray 210 upon which a plurality of documents 212 are positioned for feeding to a platen 78. An endless drive belt 214 which is formed of an extensible material such as rubber for example extends about a drive pulley wheel 216, an eccentric pulley wheel 218, and an idler wheel 220. A slot 222 (FIG. 11) is formed in the tray 210 and the wheels and belt 214 are aligned with the slot. The belt during its movement will periodically rise in the slot as is described in greater detail hereinafter. A support bracket 224 (FIG. 13) is provided and is mounted from a lower surface of the platen 78. The idler wheel 220 is rotatably supported about a shaft 226 which is mounted to the bracket 224. The shaft is adapted to be selectively positioned and secured at a location along a slot 228 which is formed in the bracket 224 in order to establish a desired tension on the belt. The wheel 218 comprises a generally circular shaped wheel which is eccentrically mounted to a shaft 230. The eccentricity is slight and comprises an offset of shaft and wheel centers of 0.094 inch for example. The shaft 230 is supported on the bracket 224 and the wheel 218 rotates thereon. The bracket 224 also serves as a bushing for a drive shaft 232. The drive wheel 216 is secured to the drive shaft 232 through a conventional overrunning clutch, not illustrated, and is rotated with the shaft. An electrically energized clutch 234 (FIG. 11) is provided for mechanically coupling the drive shaft 232 to a drive hub 236 of a gear 238. The gear 238 engages a second gear 240 which is secured to a shaft 242. The gears 238 and 240 have a gear ratio for providing a speed reduction in the rate of rotation from shaft 242 and 232. The shaft 242 is driven by a belt 244 which engages a pulley 246 secured to the shaft. The belt 244 engages and is driven by a pulley on a drive motor 248 (FIG. 10).

When the transceiving apparatus is in a ready status for transmitting, the motor 248 is energized and its drive shaft is rotating. Accordingly, the belt 244 will drive the shaft 242 from which the shaft 232 is driven when the electrically energized clutch 234 is energized and engaged. Energization of the clutch 234 occurs when the transceiving apparatus is in a standby condition and a start signal generated by the operator of the local transceiver or initiated by a signal from a remote transceiver is received.

The bottom feeding means 200 further includes a retard wheel 250 which is supported above the plate 78 and is positioned for lightly contacting the belt 214. The retard wheel comprises an elongated tubular shaped body which is mounted through an overrunning clutch (not shown) to a shaft 252. The shaft 252 is journaled in bearing surfaces of a bracket 254 extending from a lower surface of support plate 256. As is indicated in greater detail hereinafter, the plate 256 can be further separated from the tray 210 and the plate 78 for providing access to the area to clear paper jams. The wheel 250 functions to restrict the forward transfer of documents above the lower document in the stack 212.

The document feeder 200 thus far described provides a variable contact of the belt with the stack of documents. More particularly the eccentricity of the wheel 218, causes the extensible belt 214 to project through the slot in the document tray where it contacts the bottom sheet of the stack of documents. The belt 214 contacts the retard wheel 250 along a portion of its periphery. An arc of the wheel 250 which is thus contacted in terms of an angle subtended of this arc, is referred to as wrap angle. The eccentricity causes a varying and cyclic wrap angle and a varying and cyclic tension in the belt. This varying belt contact with the stack, the varying wrap angle and the varying tension provide a set of parameters which are optimum for any document being sorted. As a result, a reduction in undesirable missed feeds is attained. As a document is advanced through the feeder and is transported by pinch rollers, disclosed hereinafter, the drag on the traction belt 214, which is declutched, is reduced by the rotation of the eccentric wheel 218 which reduces tension and the wrap angle of the belt. This prevents the feeding document from dragging succeeding documents therewith.

In the arrangement disclosed, various types and conditions of documents can be reliably fed because the belt tension and the wrap angle are varying continuously. Additionally, the retard wheel 250 randomly indexes resulting in a distribution of wear. Indexing occurs when an unequal tension between the upper and lower belt sections due to the change of belt pitch length induced by the eccentric wheel 218 is equalized. This feature improves the service life of the retard wheel. In an apparatus constructed in accordance with the disclosure herein, the document feeder reliably feeds from a stack of up to 100 documents which range in thickness from 0.002 inches to 0.008 inches, in length from 5 to 14 inches, in width from 7 to 9 inches and in stiffness from a Gurley 15 minimum to a Taber 40/20 maximum.

A document which is sorted from the stack is advanced to a first lower pinch roller assembly 300 which transports the document to the reading station and subsequently to a second lower pinch roller assembly 302 which transports the document from the reading station to a discharge chute and receptacle 303. The pinch roller assembly 300 includes the drive shaft 242 upon which a plurality of rollers 304, 306, and 308 and two additional rollers not shown are mounted for rotation therewith. As indicated hereinbefore, the shaft 242 is belt driven by the pulley 246 from the motor 248. The platen 78 includes a plurality of apertures 310, 312, and 314 and two not illustrated through which the pinch wheels extend for engaging a lower surface of the document being advanced to the reading station. The second pinch rollers assembly 302 includes a drive shaft 316 which is journalled for rotation in support plates 318 and 320. There is mounted to the shaft 316 a plurality of pinch wheels 322, 324 and 326 and two not shown which extend slightly through associated slots formed in the plate 78. A pulley 334 is secured to the shaft 316 and is driven by a belt 336 which engages a pulley 338 secured to the shaft 242. Thus, as the pulley 246 is driven by the motor 248, the shaft 242 and the belt 336 will also be driven thereby rotating the shaft 316 and the pinch rollers positioned thereon.

Figure 12:
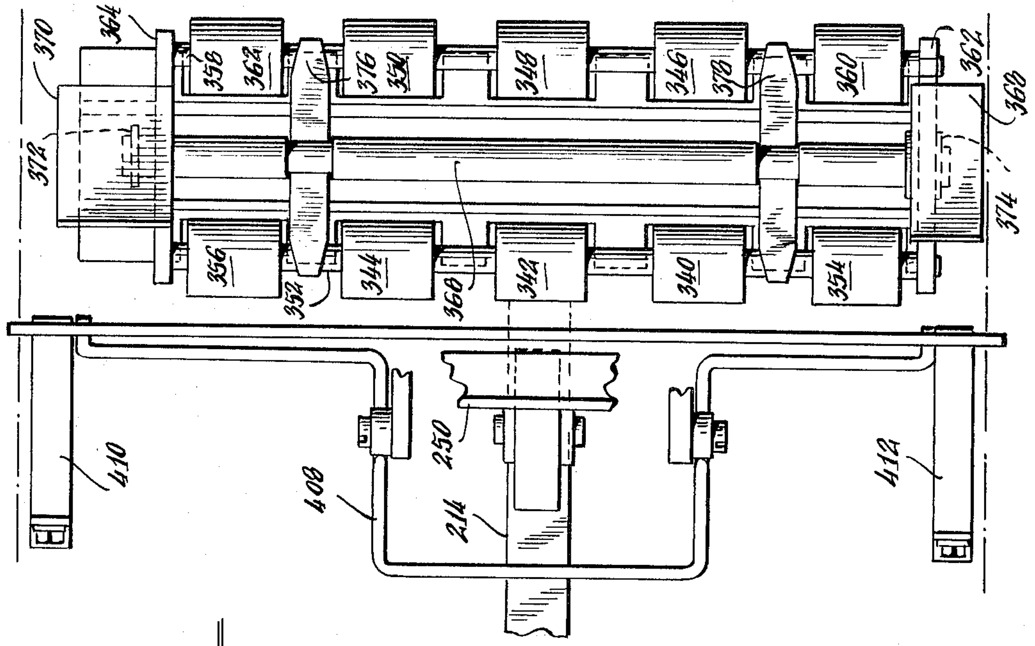
FIG. 12 is a sectional view taken along lines 12—12 of FIG. 10.

A plurality of upper rolls are provided for operating in cooperation with the lower pinch rolls. In FIG. 12, there is illustrated an assembly of upper pinch rolls mounted on shafts 352 and 358. The upper pinch rolls 340, 342 and 344, 354 and 356 on shaft 352 contact and operate in conjunction with the lower rolls 304, 306 and 308 and the two not illustrated on shaft 242. Similarly, there are upper pinch rolls 346, 348, 350, 360 and 362 to contact contact and operate in conjunction with the lower pinch rolls 322, 324 and 326 and the two rolls not illustrated on shaft 316. The support shafts 352 and 358 extend between and are supported in cradles formed in support brackets 362 and 364. A rod 366 also extends through slotted apertures in the brackets 362 and 364 as well as through apertures in depending support brackets 368 and 370. The rod is secured to the latter brackets by C rings 372 and 374 (FIG. 12) which are fitted over grooves in the end segments of the rod 366. Resilient spring biasing members 376 and 378 engage the rods 352 and 358 as well as the shaft 366. A mechanical bias is thus exerted on the shafts 352 and 358 for securing these shafts in their cradles. In addition, the rod 366 is adapted for translation along the length of the groove formed in the brackets 362 and 364. As the plate 256 is lowered toward the tray 210 and platen 78, the rod 366 rises in the grooves and is then forced downward thereby increasing the force exerted on the idle wheel shafts 352 and 358. As the plate 256 is raised, the rod 366 descends in the grooves thereby reducing the force exerted on these shafts. This equalizes the tension between the shafts and rolls and provides increased design tolerance for latching.

As indicated, the upper plate 256 is hinged or pivoted for rotation in order to provide accessibility to the feeding station for clearing jams. A rod 400 (FIG. 11) extends between bracket segments 402 and 404 which are formed integrally with and extend from the platen 78. The rod extends through an aperture in a bracket 406 (FIG. 10) which is secured to a lower surface of the plate 256. A similar oppositely disposed bracket, not illustrated, is provided and the plate 256 can be rotated about the rod 400. A handle grip 408 is provided and is mounted to a depending segment of the plate 256 for providing a grasp for raising and lowering the plate 256. Spring bias latches 410 and 412 (FIG. 12) are also provided for latching and securing the plate 256 in a lowered position. A cover member 414 is provided and secured to the plate 256.

Figure 11:
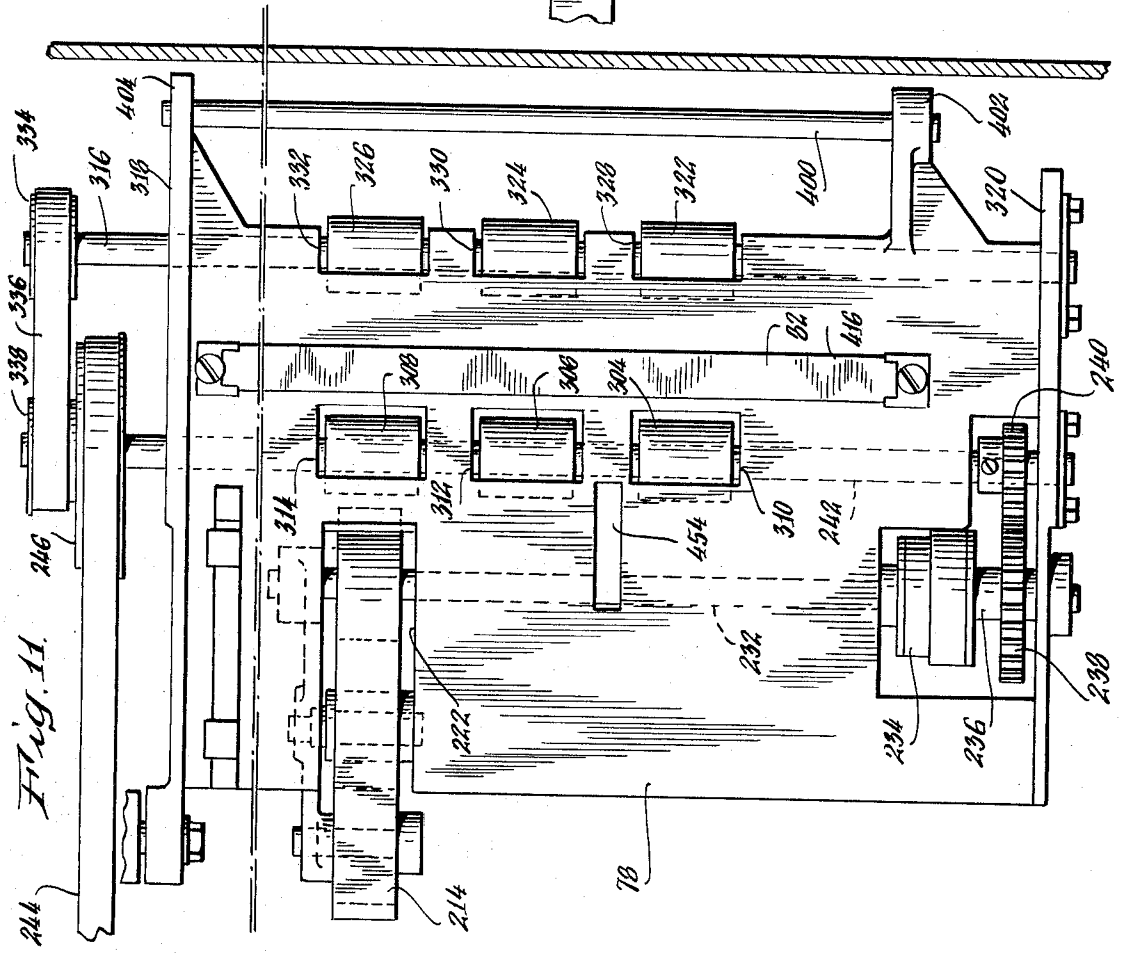
FIG. 11 is a sectional view taken along lines 11—11 of FIG. 10.

The reading station, which is best illustrated in FIGS. 11 and 14, includes a slot 416 formed in the platen 78. There is positioned in and secured in this slot a transparent body 82 comprising a strip of optical quality glass, for example. In order to provide desired reflectivity characteristics, a reflective document backing body 420 is provided and is positioned opposite the transparent body 82. The reflective body 420 extends coextensively with the transparent strip 82 and is captivated in a support body 422 (FIG. 14) which is mounted between the brackets 362 and 364 and is transported therewith. Thus, as the plate 256 is lowered to an operating position, the backing strip 420 is brought into position adjacent the transparent body 82. The body 420 is comprised of a plastic for example and preferably is gray in color. A document which is being scanned is transported by the pinch rollers between this body 422 and the transparent strip 82. At the reading station the focused spot of the laser beam 54 will be deflected across the surface of the document in a direction transverse to the motion of the document. Light is reflected from the document in a Lambertian mode with any specular component due to surface conditions of the document being reflected normal to the document surface and therefore in the same plane but reversed in direction with respect to the incident laser beam. The elongated photodetector 84 is positioned away from this reflection path and positioned for providing that a proportion of the diffused light will be detected. Thus the video pick up system is insensitive to variations in the surface finish of documents thereby enabling glossy or matte documents to be scanned with equal fidelity.

The sensitive surface of the photodetector 84 extends beyond the width of the widest document to be scanned so that a similar active area of detector will be exposed if the spot is being viewed when it is at the center of the document and also when it is at the extreme edge. This assures that the electrical signals generated at the photodetector by a black and white area at the edge of the document will be consistent with those generated by the same area at the center of the document.

Since at any time, independent of the position of the spot with respect to the detector, the total active area of the detector is receiving light from the spot then local non-uniformity of response of the surface of the detector will not cause local non-uniformity in the generated video signal.

The generated video signal is caused by the light energy incident on the surface of the detector being partially converted to electrical energy by a well known mechanism. This informational signal is coupled to preamplifying circuits for transmission to a remote receiving station The status of the scanning station is monitored by electrical contact means. A first contact means comprises a switch 450 such as a microswitch having an extending arm 452. A segment of the arm 452 extends through a slot 454 which is formed in the platen 78. When the arm segment extends through this slot, the switch assumes a first position indicative that a leading edge of a document has not been transported past the reading station. A similar switch 456 is provided having an actuating arm 458. The arm 458 extends through a similar slot in the document tray 210. In the switch position shown in FIG. 14, the switch indicates that documents have not been loaded, whereas the location of the arm 458 below the surface will indicate that a document is stationed for transport to the reading station. The information provided by the switches 450 and 456 is utilized for control in the transceiving apparatus.

The printing station 38 of FIG. 2 includes means for the xerographic reproduction of a document. As is well known, a xerographic process includes the steps of forming a uniform electrostatic charge on a photoreceptor surface, forming a latent electrostatic image on the photoreceptor surface by exposing the charged surface to activating electromagnetic radiation in an image configuration, developing the latent electrostatic image by contacting the surface with pigmented electroscopic toner particles which selectively adhere to the latent electrostatic image, transferring the developed image to a record medium and fusing the transferred image to the medium. FIGS. 15–20 illustrate a facsimile transceiver having a xerographic printing means. A photoreceptor surface 500 (FIG. 20) is provided and is formed on an outer surface of the drum shaped body 70. The drum 70 comprises a tubular shaped metal body formed of aluminum for example and hub support members 502 and 504 (FIG. 19) which are inserted in opposite ends of the drum. These hub members include integral segments 506 and 508 respectively in which a bore is formed. A drive shaft 510 extends through the bores in the segments 506 and 508, and is supported on a frame wall 512 by a ball bearing 514 and on an opposite frame wall 516 by a bushing 518. This bushing includes a threaded outer surface which engages an internally threaded segment 520 which, in turn, is integrally formed in the wall segment 516. A clip 522 functions as a means for maintaining electrical ground on the shaft 510.

Figure 17:
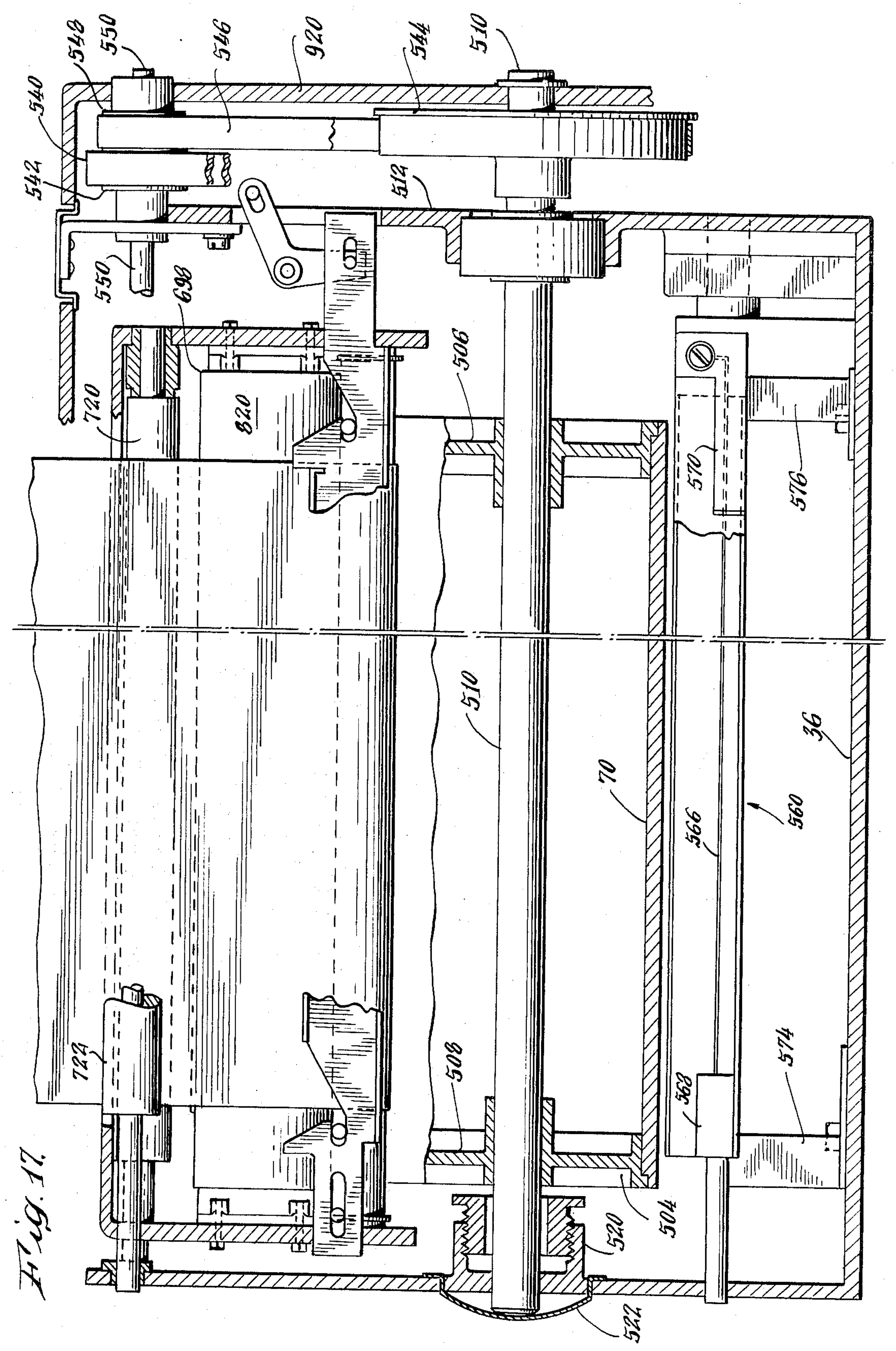
FIG. 17 is a view taken along lines 17—17 of FIG. 15.

Rotary motion is imparted to the drive shaft 510 and thus to the drum by the drive motor 248. This motor comprises a conventional stepping motor which can be excited at different rates in order to vary the rate of rotation of the drum 70 and other moving units of the transceiving apparatus which derive their motion from this motor. The motor will, for example, rotate at one of a number of different rates in accordance with the rate of transmission from a remote transceiver apparatus. Further, during the reproduction of a single document, the motor will be energized in a manner for causing a predetermined rate of rotation while the latent electrostatic image is being formed and developed on its surface and at a relatively faster rate thereafter in order to expedite the transfer of the image to copy paper and the discharge of the copy from the machine. The drive motor 248 includes a drive shaft 524 having an electrically energized clutch 526 coupled thereto. When energized, the clutch mechanically couples the shafts 524 to a clutch drive 528 upon which a pulley 530 is mounted. A drive belt 532 engages the pulley 530 and another pulley 534 which is rotatably mounted on a cleaning web take-up drive shaft 536. A second pulley 538 is similarly rotatably mounted on the drive shaft 536 and is coupled to and driven by the pulley 534. A drive belt 540 engages the pulley 538 and a pulley 542 which is secured to a copy paper drive shaft 550. A pulley 544 is also mounted on the shaft 510 and a belt 546 engages this pulley and a pulley 548 (FIG. 17). The pulley 548 is secured to the drive shaft 550 which functions as a pinch roller for advancing a record medium, discussed in detail hereinafter.

There is formed on the outer surface of the drum 70 a layer of photoconductor material such as selenium or alloys thereof which is deposited on an electrically conductive substrate body. The film preferably has a thickness of about 55 to 60 microns. Generally, an interface is formed on the substrate body prior to the deposition of the photoconductor material thereon. The interface functions to provide an electrically resistive barrier between the photoconductor layer and the substrate. During image reproduction, a uniform electrostatographic charge is initially formed on the photoconductor surface. The surface is then exposed to activating electromagnetic radiation in image configuration. The photoconductor material automatically alters the charge on its surface in those areas which have been exposed to activating electromagnetic radiation. Photoconductor alloys suitable for use in the present invention include, without limitation, selenium alloys with arsenic, telorium, thalium, antimony, bismuth and mixes thereof. U.S. Pat. Nos. 2,803,542; 2,822,300; 2,745,327; 2,803,541; 2,970,906; and 3,312,548 illustrate in more detail suitable applications and process techniques for selenium and selenium alloys.

Figure 15:
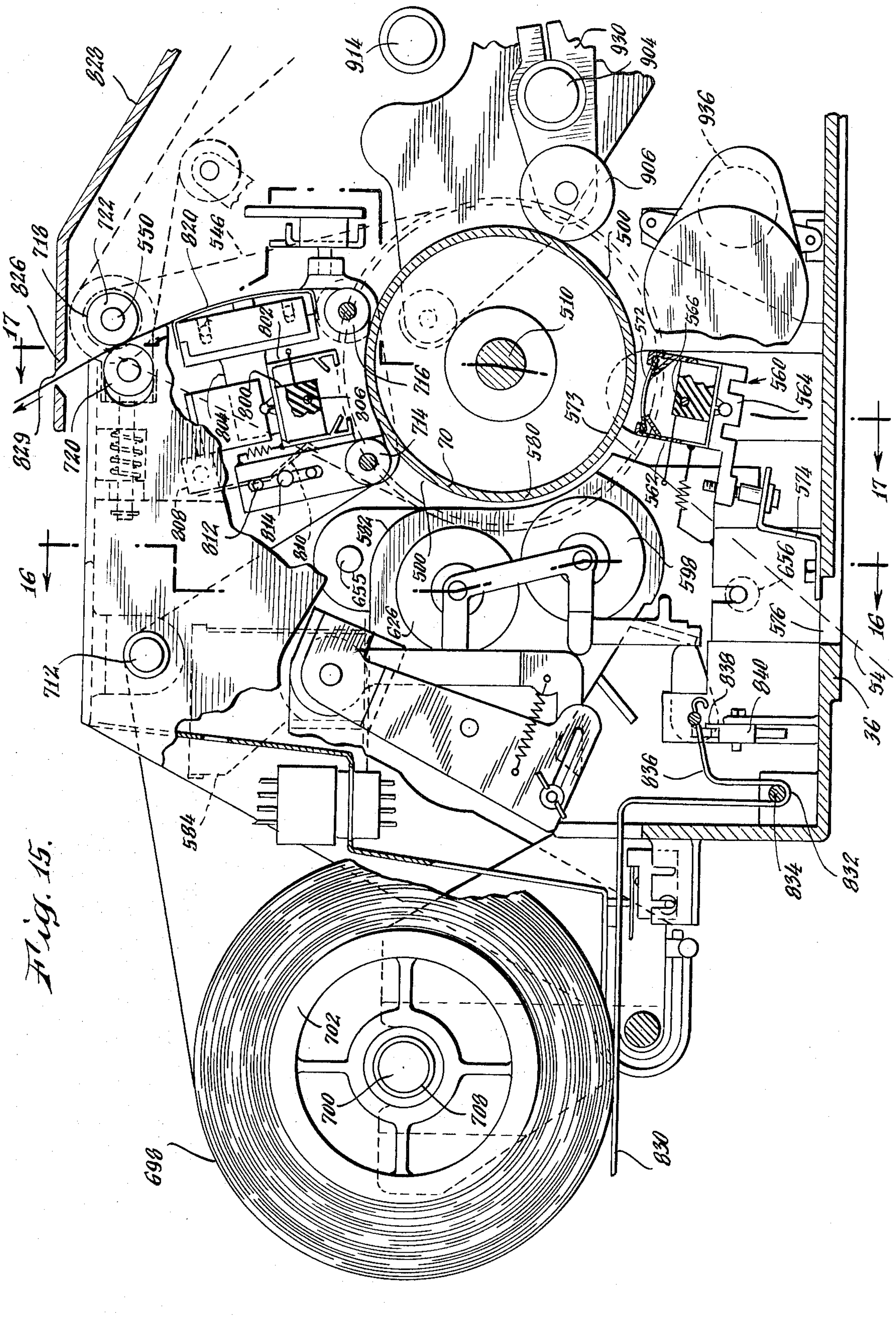
FIG. 15 is an enlarged view of a developer station of the transceiving apparatus of FIG. 2.
Figure 20:
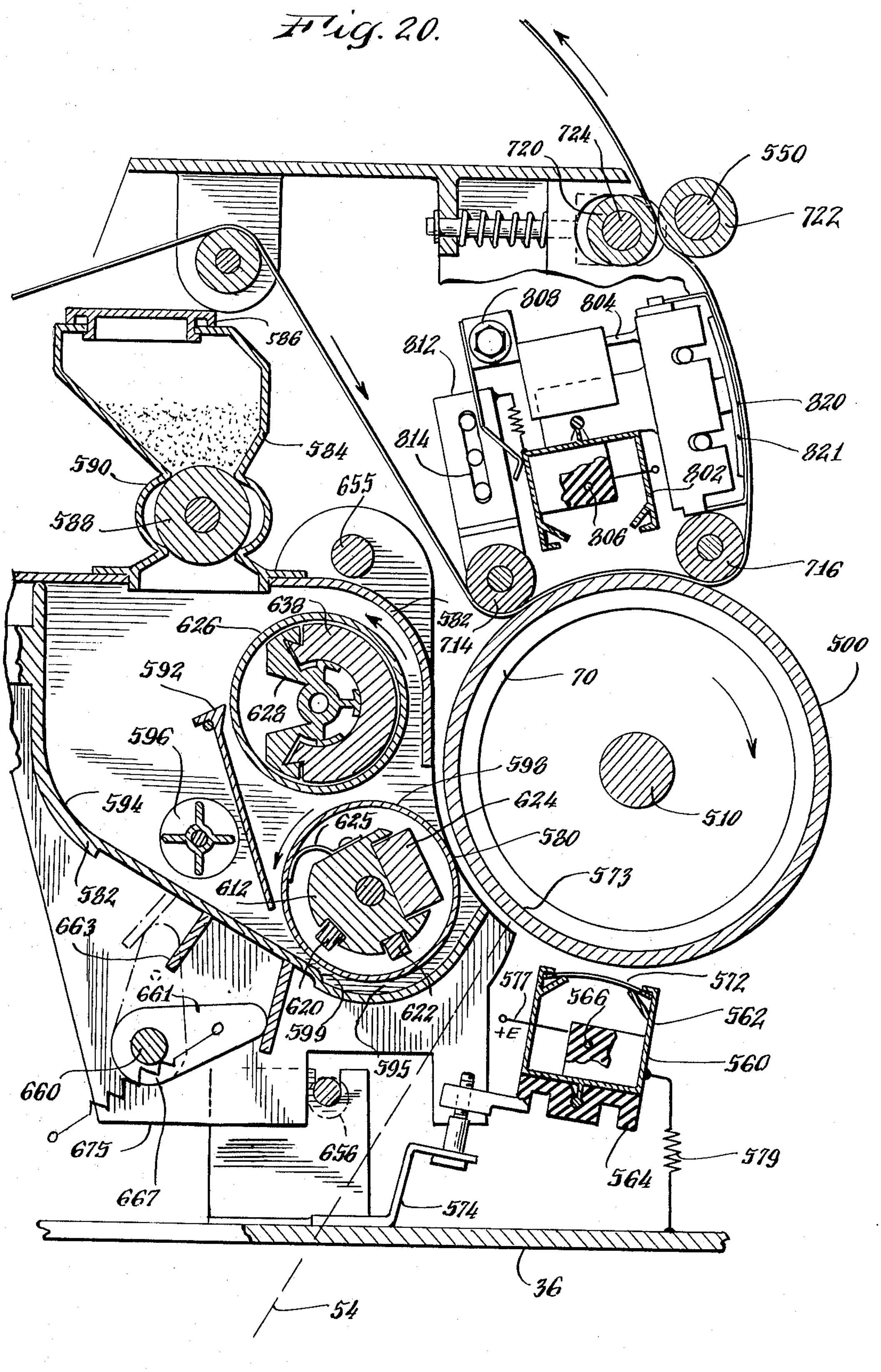
FIG. 20 is an enlarged sectional view of a portion of the printing station of FIG. 2.

During operation of the apparatus, the electrostatographic drum 70 is rotated in a clockwise direction as viewed in FIGS. 15 and 20. During this rotation, and during a printing cycle, the outer surface 500 of the drum 70 will pass in close proximity to a corona charging device 560. This charging device which is illustrated in FIGS. 15 and 20 is shown to comprise a scorotron. The scorotron includes a generally channel shaped shield member 562 which is mounted on an electrically insulating scorotron support member 564.

A relatively small diameter conductive rod 566 is supported by and extends between insulating support members 568 and 570 (FIG. 17). A screen electrode 572 is also provided and is supported from insulating members 568 and 570. The support body 564 is supported at opposite ends thereof by studs which are mounted to brackets 574 and 576. An electrical potential +E is applied to the conductor rod 566 by an input lead 577. The screen 572 and the shield 562 are conductively coupled and operated at a potential differing from ground potential by the use of resistive impedance 579 which is coupled between the shield body 562 and the plate 36 which is at ground potential.

The scorotron as is well known is a corona ionization device which establishes a plurality of ions about the rod 566. These ions are accelerated to the photoconductor surface 500 by forces of electrostatic attraction existing between the ions and the surface. A feature of the disclosed transceiver apparatus is the provision of a variable speed drum 70 and the use of the scorotron corona charging device. The scorotron establishes a relatively uniform charge on the surface 500 substantially independently of the rate of rotation of the drum 70 within a range of angular velocities of the drum necessary to accomodate the aforementioned diverse scanning rates. The spacing between the scorotron and the drum is generally relatively small and the distance therebetween is adjustable by virtue of the adjusting threaded studs which support the scorotron support member 564 from the bracket 574.

The drum continues to rotate in a clockwise direction past the charging station toward an exposure station 573, (FIGS. 15 and 20). At the exposure station, the laser light beam 54, which was described in detail hereinbefore, is scanned across the now uniformly charged photoconductor surface. The beam 54 which is modulated in intensity as described in the aforementioned copending U.S. Pat. application Ser. No. 253,827 filed concurrently herewith, is projected through an aperture 576 in the transceiver support plate 36. The cross sectional geometry of the beam at this point is the same as that at a location 575 at the scanning station (FIG. 14) since the geometric distance from the lens 140 to location 575 through the reflective scan system 62, 64, 74, 76 and location 575 is chosen to be the same as the distance from the lens 140 to the incident point on the drum through the reflective point system 62, 64, 66 and 70. Thus, as the drum 70 rotates, the beam scans the length of the drum, then rapidly retraces to an initial point in preparation for the scanning of a succeeding line.

Development of the latent electrostatic image is accomplished by contacting the photoconductor surface with pigmented, microscopic, electroscopic, thermoplastic toner particles. The particles adhere to the surface 500 in image configuration. The developer also includes relatively larger carrier particles formed of a ferromagnetic material. Both the toner particles and the carrier particles exhibit triboelectro characteristics whereby the toner particles adhere to the outer surface of the carrier particles. The ferromagnetic particles and the adhering toner particles are conveyed by a magnetic means at a developing station indicated generally by the reference numeral 580 (FIG. 20) to the photoconductor surface 500. The particles contact the surface 500, and the triboelectro characteristics of the particles relative to the polarity of the charge of the latent electrostatic image cause the toner particles to transfer to and adhere on of the photoconductive surface 500 in image configuration.

The developing means for conveying the developer material to the developing station 580 (FIG. 20) includes a reservoir or container 582 upon which is positioned a hopper 584. The hopper is closed by a closure body or cap 586. A developer mixture employed for developing the latent electrostatic image is deposited within the hopper 584. A dispensing 588 roll is provided in a bulbous section 590 of the hopper for causing the developer material to fall into the housing 582. The particles which are thus agitated will fall into the reservoir 582 to the left of a baffle plate 592 as viewed in FIG. 20. The developer material accumulates between a slopping surface 594 of the reservoir and the baffle plate 592. A paddle wheel shaped agitator 596 is positioned in this area and is rotated continuously, thereby mixing the carrier and the toner particles in order to maintain a uniform mixture and triboelectric charge thereof. The developer material is funneled from this area to a sump 595 at the lowest portion of the reservoir 582. The particles flow between a cylindrically shaped sleeve 598 and the surface 594 to the sump section of the reservoir which as viewed in FIG. 20 is located to the right of a step segment 599.

A transport assembly for transporting the particles from the sump area 595 to the developing station 580 includes the elongated sleeve 598, and an elongated magnet assembly which is positioned within the sleeve. The sleeve 598 is tubular shaped and is formed of aluminum for example. Hubs 600 and 602 (FIG. 16) are positioned within the sleeve and include shaft segments which are mounted in bearings 604 and 606 thereby providing rotatable mounting of the sleeve. A gear 608 is mounted on one hub segment 610 and is engaged by drive gear means 654 for causing rotation of the sleeve. The sleeve 598 is rotated in a counterclockwise direction as viewed in FIG. 20.

An elongated generally cylindrically shaped support body 612 formed of a nonferromagnetic material is mounted by shaft segments 614 and 616 which extend internally of the sleeve hub segments. The sleeve hub segments 600 and 602 are therefore free to rotate about the stationary segments 614 and 616, respectively. A plurality of elongated magnet members 620 and 622 (FIG. 20) are positioned on and are mounted to the support segment 612. These magnetic members provide a field extending toward the sump area 595. The sleeve 598 includes a flame treated outer surface which is relatively coarse. Thus, as the sleeve 598 rotates, a magnetic field established by the magnets 620 and 622 attracts the developer particles to the surface 598 from the sump. Surface coarseness results in adherence of the particles to the surface as the sleeve rotates into the vicinity of a relatively stronger field established by an elongated magnet 624. This magnet causes the particles to align in a radial direction from the center of rotation. However, because of a relatively small spacing between the photoreceptor surface 500 and the developer material transport surface of the sleeve 598 at the developing station 580, the radially extending developer material is folded over in the manner of a brush along the photoreceptor surface 500. The toner particles therefor contact the photoreceptor surface and adhere thereto in image configuration. As the sleeve 598 continues to rotate, the developer particles are rotated out of the field developed by the magnet 624 to a position adjacent to a second sleeve shaped body 626. This body functions to return those particles which have been carried past the developing station to the reservoir and to the sump. The rotating sleeve 598 and the magnet assembly are maintained at a same potential by a contact strip 625 which is mounted to the magnet assembly and makes sliding contact with the inner surface of the sleeve 598.

The means for returning the particles to the reservoir after development include in addition to the sleeve 626, a stationary magnet assembly mounted on a support member 628 which is positioned within the sleeve 626. The sleeve 626 which is formed of aluminum, for example, and which has a roughened flame hardened surface is mounted on hubs 630 and 632 (FIG. 16) for rotation therewith. The support body 628 is stationary and is positioned on shaft segments 634 and 636 which extend through the hubs 630 and 632 respectively thereby permitting rotation of the hub about these segments. An elongated permanent magnet 638 is mounted on the support body 628 and has an outer segment thereof which conforms to the inner surface of the sleeve 626. As the sleeve 626 rotates in a counterclockwise direction as viewed in FIG. 20, and the sleeve 598 also rotates in a counterclockwise direction, a field established by the magnet 638 will cause those particles which remain on the surface of the sleeve 598 after passing the developing station 580 to transfer to and adhere to the outer surface of the sleeve 626. These particles are thus transported in a counterclockwise direction to an uppermost position at which point the magnetic field intensity decreases substantially and the particles fall by gravity from the surface 626 into the sump.

Figure 16:
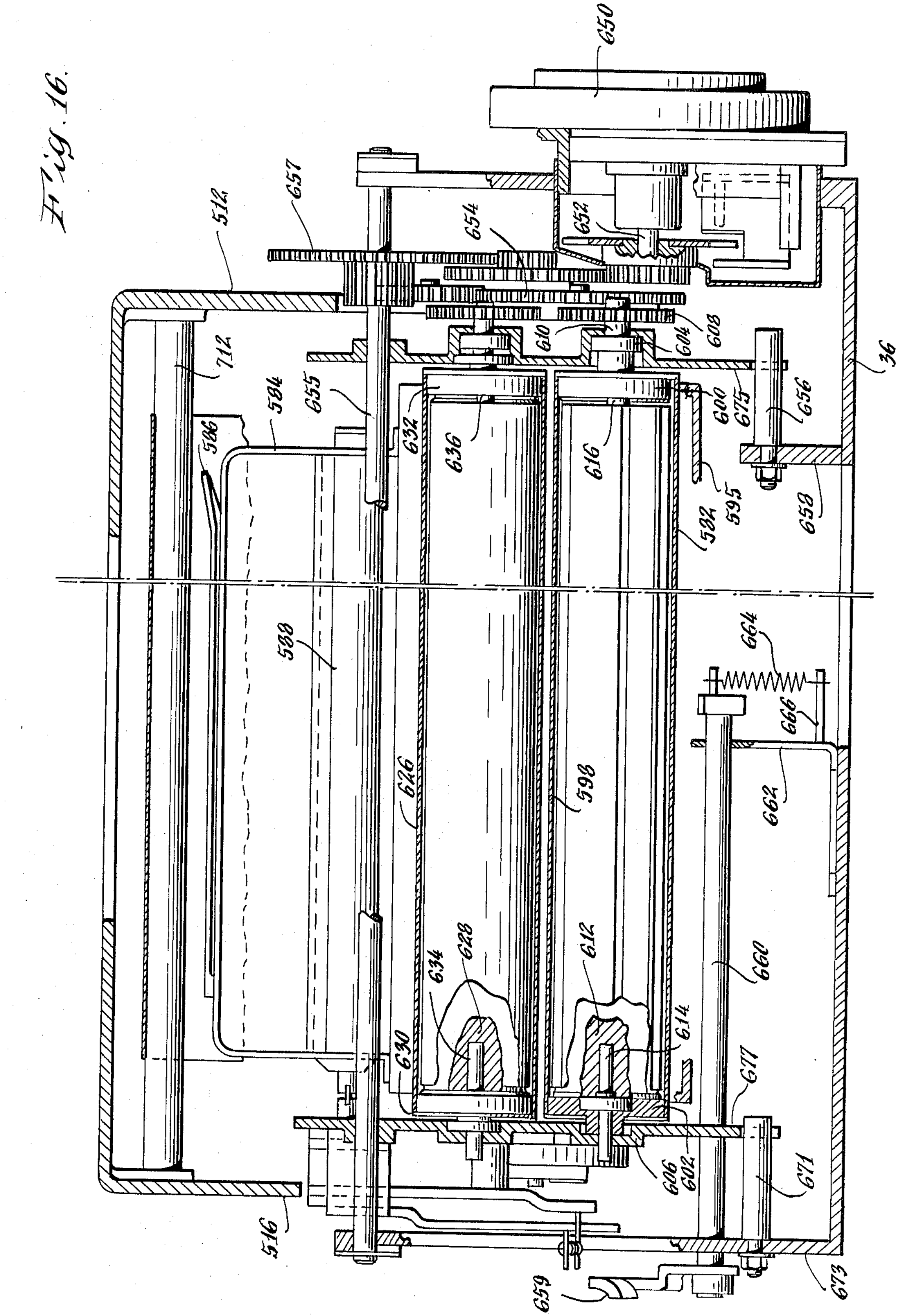
FIG. 16 is a view taken along line 16—16 of FIG. 15.

A drive means for the developer assembly comprises a relatively flat motor 650 (FIG. 16) having an output shaft 652 which is coupled by a gear train 654 to the drive hubs of the sleeves 598 and 626 and to the agitators 588 and 596. The gear train is adapted to provide the desired torque and speed requirements for the different elements. As illustrated in FIG. 16, the reservoir housing 582 is pivotally supported above the support plate 36 by a horizontal extending rod 655 which extends between and is rotatably mounted to upstanding brackets 512 and 516. A gear means 657 is mounted to the support rod 655 for providing engagement of the gear train 654 with the drive shaft 652 and the reservoir is rotated about the shaft 655 in order to establish a desired spacing with the drum surface. A lever arm 659 is connected to a shaft 660 for rotating the reservoir 582 to a location spaced away from the drum surface. A cam 661 which is secured to the shaft 660 is rotated and engages a boss 663 for rotating the reservoir 582 in a clockwise direction away from the drum surface 500 as viewed in FIG. 20. Alternatively, the cam 661 contacts a boss 665 for rotating the reservoir in a counterclockwise direction toward the drum. Bias spring means 667 is provided and is arranged for establishing an over-center toggle action thereby locating the reservoir in the retarded or advanced position.

Spacing between the drum and the reservoir 582 is established by eccentric rods 656 and 671. These rods which are mounted to a bracket 658 and a wall segment 673, respectively extend into slots formed in reservoir brackets 675 and 677 respectively. Rotation of the eccentric shafts 656 and 671 will then establish the extent of counterclockwise travel of the brackets and establish spacing between the reservoir and the drum. The reservoir can then be moved away from the drum for servicing procedures and is readily returned to an accurate drum-reservoir spacing.

The drum continues to rotate at a predetermined rate while the line scanning proceeds and until the document which is to be reproduced has been imaged and developed on the surface of the drum. At that point, assuming that a last document in a transmission is being processed, the drum is automatically rotated at a relatively higher rate in order to expedite the fast feed of copy from the machine. The speed-up of the drum is accomplished by increasing the excitation rate of the stepping motor 248. Circuit means such as shift register and output driver means are provided and coupled to the counter. As disclosed in the referred to copending U.S. patent application Ser. No. 253,827, the sending transceiver is adapted for generating an end of transmission signal component. This component is detected and employed to increase the rate at which the ring counter is stepped thus increasing the rate of rotation of the motor drive shaft.

Figure 23:
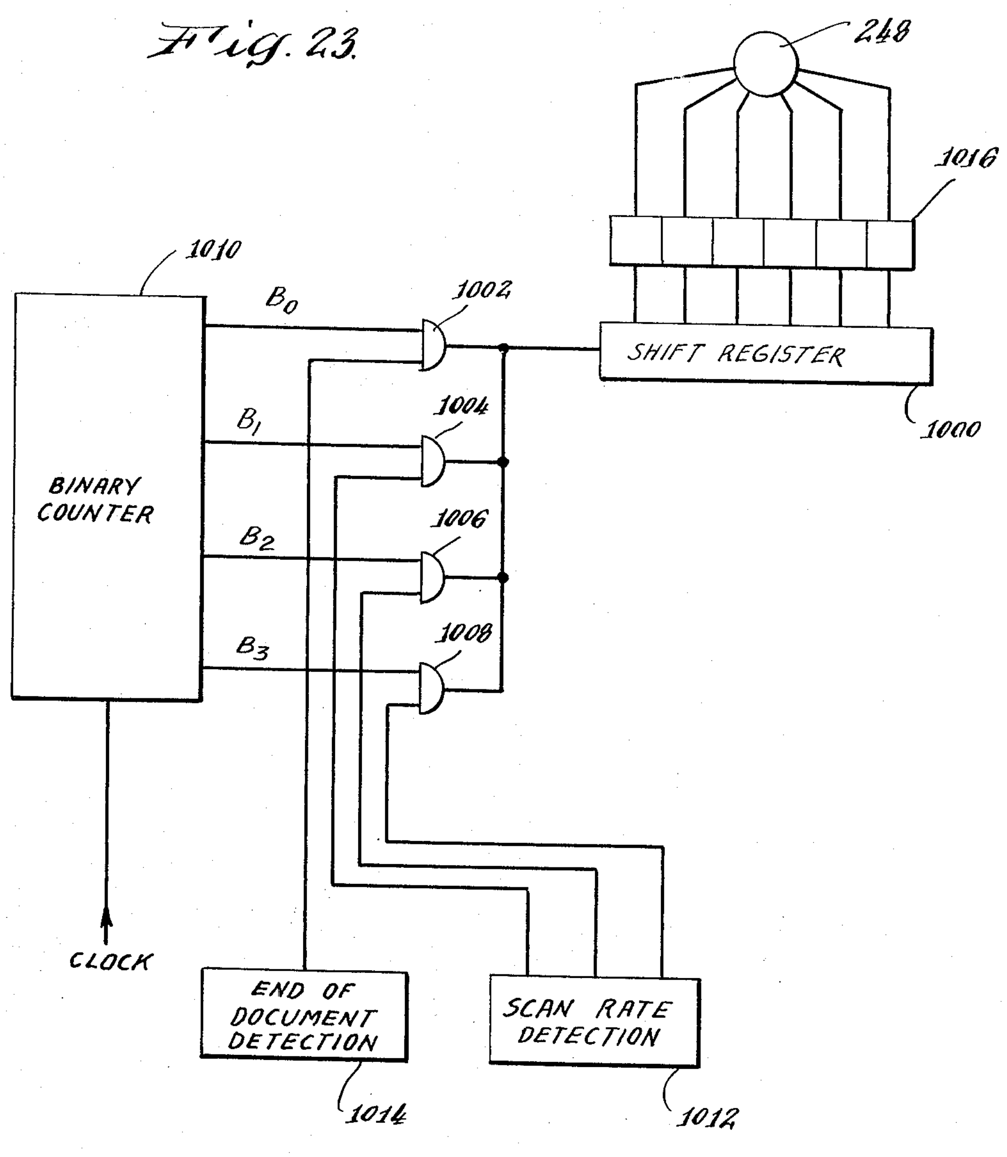
FIG. 23 is a diagram of a motor control circuit.

FIG. 23 illustrates in block diagram form an arrangement for varying the speed of rotation of the stepping motor. A shift register 1000 is stepped by an input signal derived from one of a plurality of AND gates 1002, 1004, 1006, and 1008. One of the inputs to each of the AND gates is an output from a stage of a binary counter 1010 which is stepped by clock pulses. The more frequently occurring output pulse from the binary counter will occur from the stage $B_0$ while relatively less frequently occurring output pulses will occur on the lines $B_1$, $B_2$ and $B_3$. The shift register stepping rate is thus dependent on which of the binary counter output lines is coupled as an input to the shift register. A scan rate detector 1012 is provided and is described in detail in the aforementioned copending Pat. application Ser. No. 253,827. The scan detector provides an output indication of the scanning rate at which the transmitting unit is scanning. An appropriate output line will then be energized in accordance with the rate at which the transmitter is scanning. A one of the AND gates 1004, 1006 or 1008 will be energized and pulses will be coupled therefrom to the shift register for stepping. Upon receipt of an end document signal component, the end of document detector 1014 enables the AND gate 1002 and the shift register is thus stepped at the relatively higher rate. Output lines from the shift register are coupled via power amplifiers indicated generally as 1006 to the stepping motor 248 for controlling its rate of rotation.

Figure 3:
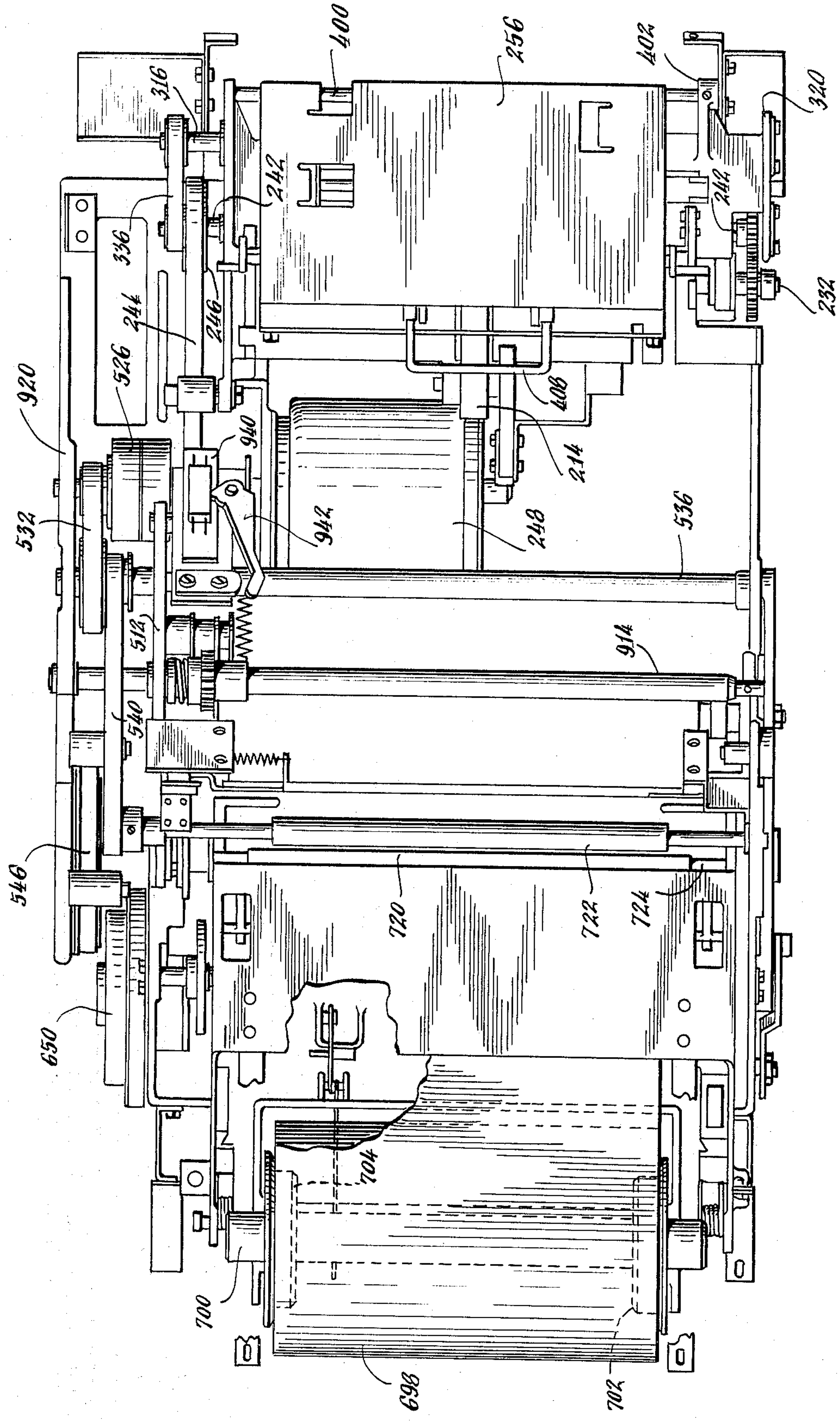
FIG. 3 is a plan view of the apparatus of FIG. 2 with the housing removed in order to show the general arrangement of the components of the apparatus.

The latent electrostatic image thus developed is advanced by the clockwise rotating drum 70 to a transfer station at which location the developed image is transferred to a paper web. A cylindrical roll or web of paper 698 (FIG. 15) is rotatably positioned about a mandrel 700. As best seen in FIG. 3, the mandrel has mounted thereto hub members 702 and 704 for securing and centrally aligning the cylindrical roll or web of paper thereon. The mandrel 700 is supported in cradle segments 706 and 708 of a paper web support integrally formed in base plate 36 (FIG. 15). The paper web is drawn successively over an idler roll 712 and past idler rolls 714 and 716 at the transfer station by a driven pinch roller assembly 718. The pinch roller assembly includes the drive shaft 550 and a pulley 542 mounted thereto (FIG. 17) which is driven by a belt 540. The belt 540 as indicated hereinbefore engages a pulley 538 which is driven via a belt 532 from the motor 248. The paper drive pinch roller assembly further includes an idler roller 720 which functions with a drive roller 722 to draw the paper from the paper roll 698 and advance it past the transfer station at the same linear rate as the photoconductor surface. The idler roller 720 is mounted on a shaft 724 which is journalled to bearing surfaces formed in frame members (FIG. 3).

The transfer of the developed image to the paper web is affected both by contact of the paper web with the developed image on the photoreceptor surface 500 and by establishing an attractive electrostatic field at the transfer station. The electrostatic field is established by a conventional corotron unit 800. The ions generated by the corotron establish a field which cause the pigmented particles to transfer from the surface 500 to the paper web in image configuration. The corotron includes a shield 802 which is supported from a bracket 804. A potential is applied to the relatively small diameter corotron electrode wire 806 through a terminal 808. The shield 802 is grounded by a contact member 810 which is connected to a grounded bracket 812. The grounded bracket 812 includes a mounting slot 814 formed thereon for adjusting the position of the bracket and thus the position of the idler wheel 714. The idler wheel 716 is similarly mounted from an adjustable bracket not illustrated.

A transferred image is fixed to the paper web by heat fusing the pigmented toner particles to the web. To this end, the paper web is drawn over a thermally conductive surface 820 such as a metal strip which is heated by radiation and convection through electrical heater strip 821 which is positioned proximate to the surface 820. The strip 821 comprises heater wires formed on a printed circuit substrate. The paper web with the image fused thereon is then fed through an aperture 826 in a cover member 828 (FIG. 15) to a tear bar 829 where the reproduced document can be separated from the remainder of the web.

In order to inhibit operation of the printing apparatus when the paper web supply is exhausted, a switching means is provided for sensing this condition. The switching means includes a sensing pickup rod 830 (FIG. 15) which is guided along the outer circumference of the paper web or roll. In the position illustrated in FIG. 15, a full roll is positioned on a mandrel and the sensing pickup 830 is oriented in a relatively horizontal plane. A U-shaped segment 832 of this pickup is positioned about a pivot rod 834 and an arm segment 836 is positioned above an actuating member 838 of a switch 840 which may comprise a microswitch. As the supply of paper becomes depleted, the sensing rod 830 follows the diameter of the paper reel and rotates in a clockwise direction about the pivot rod 834. When the diameter of the paper reel is reduced to the point that it becomes substantially equal to that of hub 702, the sensing pickup rod 830 will have rotated in a clockwise direction by a distance sufficient for actuating the switch 840. Upon actuation of the switch, the apparatus is disabled in the printing mode and an out-of-paper indication is provided to the operator.

Figure 18:
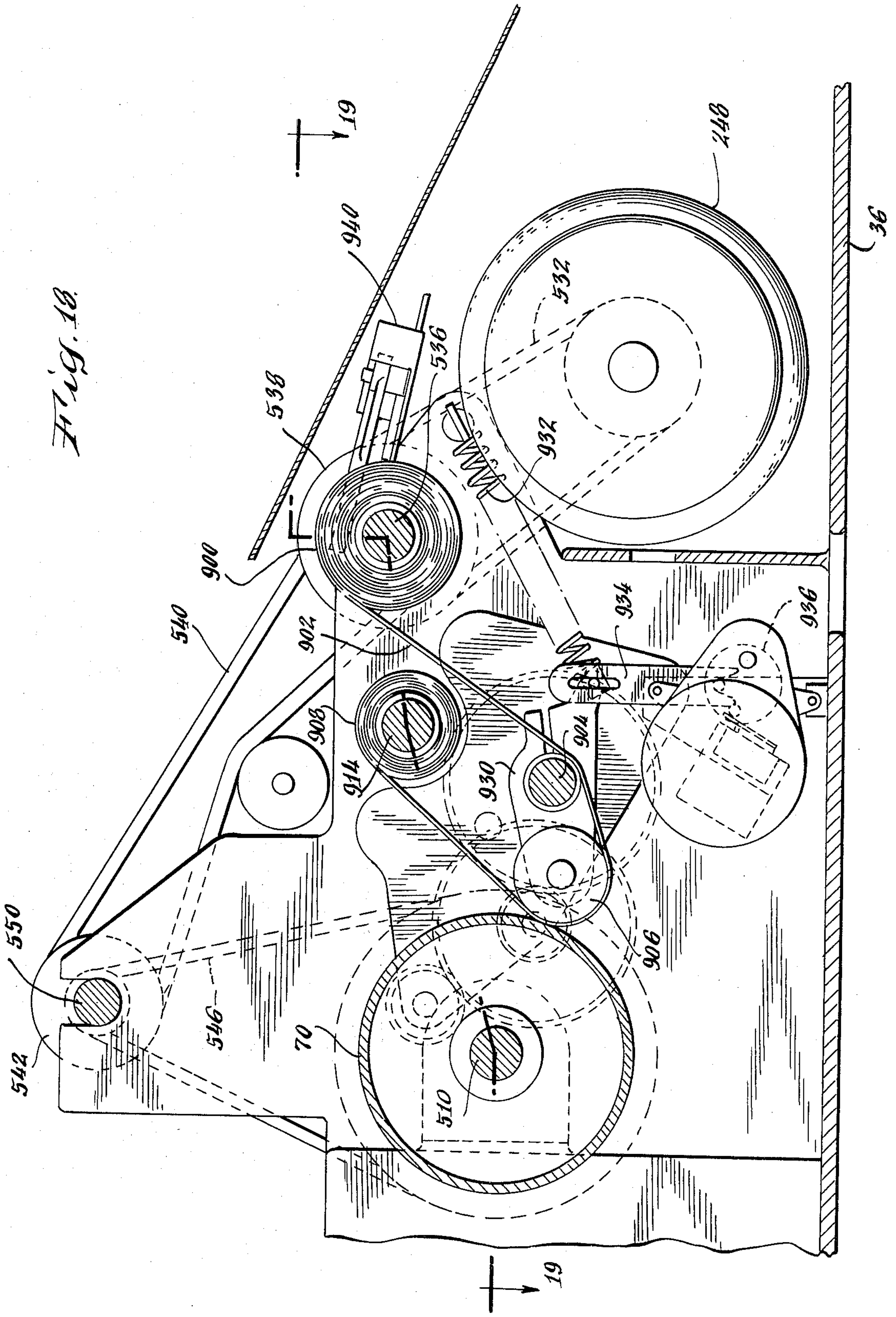
FIG. 18 is an enlarged view of a portion of the printing station of FIG. 2 illustrating a photoreceptor surface cleaning means.
Figure 19:
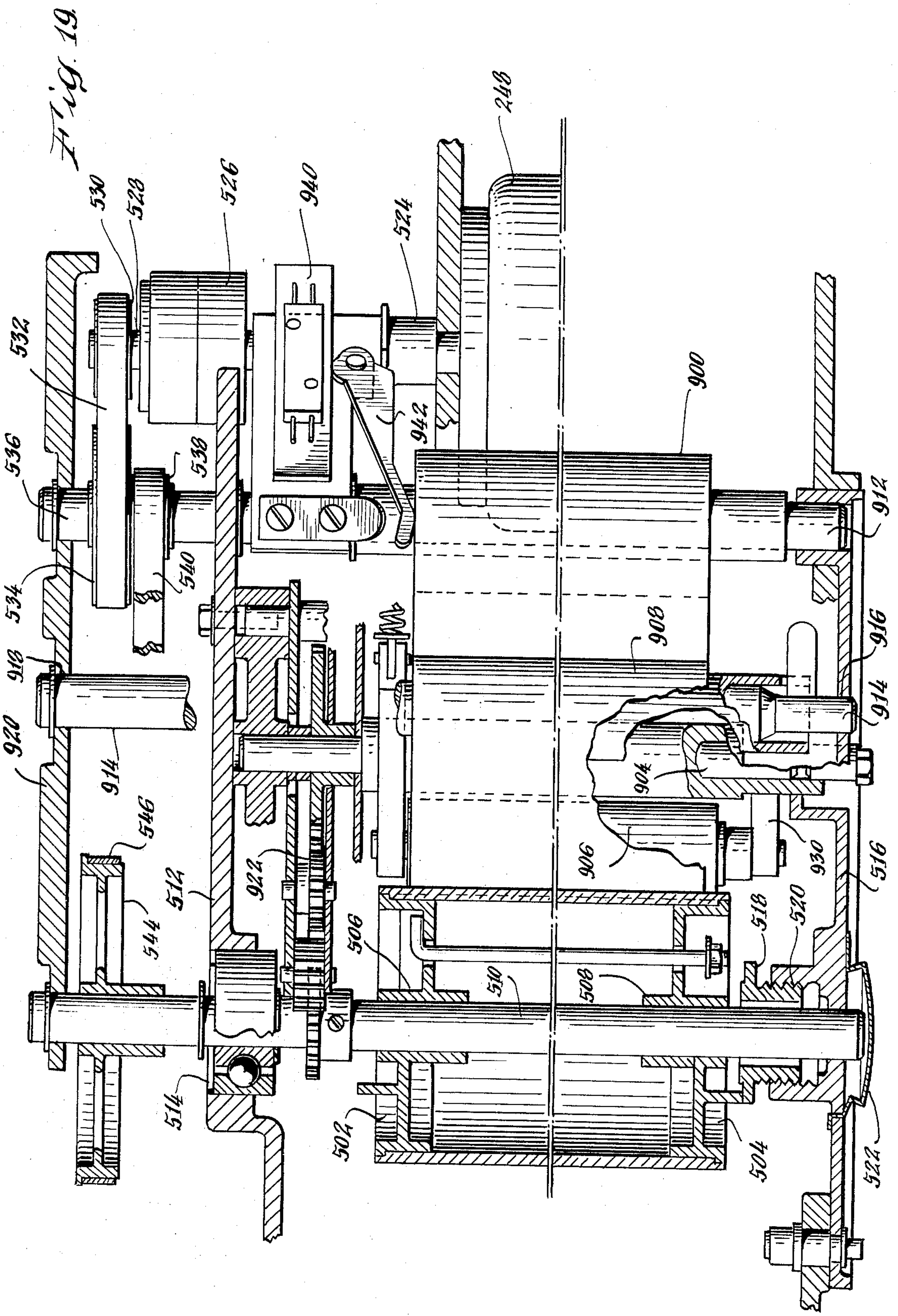
FIG. 19 is a view taken along lines 19—19 of FIG. 18.

Subsequent to the transfer of an image to the paper web from the photoreceptor surface 500 and prior to the reestablishment of a uniform electrostatic charge on the surface, it is desirable to remove from that surface residual toner particles which might otherwise interfere with subsequently reproduced images. A web type cleaning arrangement is provided which includes a paper web supply reel 900 (FIG. 18). The cleaning web 902 which is supplied from this reel is drawn successively along an idler contact wheel 906 and a paper web takeup reel 908. The supply reel 900 is mounted on the shaft 536 (FIG. 19) which is journalled at one end in a bearing surface 912 of the frame member 516. The shaft 536 is journalled near another end in a bearing surface of the upright frame member 512. Pulleys 534 and 538 are free to rotate on this shaft. The takeup reel 908 is also mounted on a drive shaft 914 which similarly is journalled at one end thereof in a bearing surface 916 of a demountable frame member 516. Another end of the takeup reel shaft 914 is journalled in a bearing surface 918 of an upright frame member 920. The takeup reel 908 is gear driven by a gear train 922 which engages the shaft 914 and engages a gear positioned on the drive shaft 510 of the xerographic drum 70.

In order to facilitate maintenance of the xerographic drum 70 and to replace the cleaning web 902, the idler wheel 906 is rotatably mounted on a bracket 930 and the bracket is rotatably mounted about the torque rod 904. A helical spring 932 is provided and is coupled to the bracket 930 allowing the bracket to be rotated in a counterclockwise direction about the tube 904 thereby creating a space between the idler wheel 906 and the drum surface 500. In addition, a cam actuated link 934 is coupled to the bracket 930. When the cam 936 is rotated to the position as illustrated in FIG. 18, the link 934 causes rotation of the idler wheel in a clockwise direction for engagement with the surface of the drum. In this position, the link 934 overcomes the biasing force exerted by the spring 932. However, when the cam 936 is rotated 180°, the link 934 follows this cam motion permitting counterclockwise rotation of the support bracket 930 under the influence of the force exerted thereon by the spring 932. The cam 936 is electrically operated and causes automatic rotation of the idler wheel 906 and the cleaning paper web into contact with the surface of the drum when operation of the printing apparatus is initiated.

The printing operation is disabled when the paper web cleaning supply reel 900 becomes depleted. A switch 940 is provided and is actuated by a sensing arm 942 (FIG. 19) which is positioned against the thickness of the reel 900. When this reel is reduced to a predetermined diameter, the sensing arm 942 rotates counterclockwise as received in FIG. 19 thereby actuating the switch 940. The switch 940 is coupled to the transceiving apparatus for disabling the printing operation and providing an indication to the operator that the printing apparatus has exhausted the paper web cleaning supply.

The electrostatographic reproduction apparatus thus described operates with various bias potentials established on the components. Generally, the frame members are maintained at ground potential. The tubular conductive drum 70 (FIG. 20) which is formed of a conductive material and which is in contact with the frame members is also at ground potential. A positive potential of about 5,600 volts is applied to the lead 577 of the scorotron, while the scorotron shield 562 and the screen grip 572 will exhibit a positive operating potential of about 800 volts. The shield 802 of the corotron assembly is maintained at ground potential and the corona rod 806 is maintained at a negative potential of about 4,700 volts with respect to ground. It is desirable that the carrier particle transport tubular bodies 598 and 626 of the developer operate at a relatively positive potential with respect to ground or a relatively negative potential with respect to a charge formed on the photoreceptor surface. The photoreceptor surface when uniformly charged by the scorotron will exhibit an electrostatic potential of about positive 800 volts. The developer is maintained at a positive potential at about 311 volts with respect to ground. Since the developer includes various conductive components, means are provided for electrically insulating the developer from the frame and from ground potential. Referring to FIG. 16, the elements which are formed of electrically insulating materials such as plastic, comprise the reservoir side wall members 675 and 677, the lever 659 and the cam 671, and the various members of the gear train for coupling power from the drive motor 650 to the tubular bodies.

There has thus been described a facsimile transceiving apparatus wherein the document is advanced along a path past a document scanning station at which station the document is line scanned by a deflected laser light beam and a video signal is formed therefrom. An electrostatographic printing means is provided for developing the image, and there are means for transferring the developed image to a record medium. The image formation means includes a line scanning laser light beam which is deflected across a photoreceptor surface of the apparatus. The line scanning means includes a laser light source and means for alternatively deflecting a laser light beam from the source across the document at the scanning station or for deflecting the light beam across the charged image retention surface at the printing station. Resolution of the scanning beam is advantageously enhanced by narrowing the cross sectional configuration of the light beam in the direction of scanning. The electrostatographic printing apparatus includes means for varying the rate at which a xerographic drum is rotated in order to provide compatible operation for transceivers having different scanning rates and in order to speed up the image transfer subsequent to the formation and development of the image. A charging means of the printing station is adapted for establishing a substantially uniform electrostatic charge on the image retention surface at the different xerographic drum rotation rates.

While there have been described particular embodiments of the present invention, it will be understood that various modifications may be made thereto without departing from the spirit of the invention and the scope of the appended claims.

What is claimed is:

1. A facsimile transceiving apparatus comprising:

a stationary scanning station;

means for advancing a document transversely of said scanning station;

means for repetitively deflecting a relatively stable light beam from one end to the other of said scanning station to scan said document;

detection means extending lengthwise of said scanning station and beyond the ends thereof for receiving light diffusely, but not specularly, reflected from said document to provide a video signal representative of said document;

an electrostatographic reproduction station including a photoreceptor surface, means for establishing a uniform electrostatic charge on said surface, means for repetitively deflecting a modulated light beam across said surface for establishing a latent electrostatic image on said surface, means for contacting said surface with pigmented developer particles, and means for transferring a developed image to a record medium; and a common source of light for selectively supplying said relatively stable light beam and said modulated light beam.

2. The transceiving apparatus of claim 1 wherein said document scanning station includes a generally planar platen having a light transmissive path through which said light beam is projected for scanning of said document.

3. The transceiving apparatus of claim 2 wherein said light transmissive path comprises a slot formed in said platen.

4. The apparatus of claim 2 wherein said detection means includes an elongated light responsive detecting element extending substantially coextensively with said light transmissive path.

5. The apparatus of claim 2 including means for positioning at said scanning station a document backing member which extends coextensively with said light transmissive path and exhibits relatively high reflectivity characteristics.

6. The tranceiving apparatus of claim 2 including pinch roll transport means positioned on opposite sides of said light transmissive path for advancing a document past said scanning station.

7. The apparatus of claim 6 wherein said pinch roll means comprises driven rolls having surfaces thereof which are positioned with respect to a surface of said platen for engaging a document;

a support plate positioned opposite said platen and adapted to be advanced toward said platen; and, pinch drive idler rolls supported from said plate and adapted to contact said driven rolls when said support plate is advanced toward said platen.

8. The apparatus of claim 7 wherein said pinch idler rolls are adapted for contacting said driver rolls with substantially equal pressure.

9. The transceiving apparatus of claim 7 including an elongated document backing body supported from said plate and extending substantially coextensively with said light transmissive path, said backing body being juxtapositioned with respect to a document positioned at said station when said plate is advanced toward said platen.

10. The transceiver apparatus of claim 1 wherein said photoreceptor surface is positioned on a rotatably mounted drum shaped support body, said developer means includes a housing having a portion thereof shaped for conformity with said photoconductive surface; means for depositing in said housing a developer material comprising a mixture of ferromagnetic carrier particles and relatively smaller pigmented toner particles, and means for transporting said mixture from a sump of said housing to a location adjacent to said photoconductor surface.

11. The transceiver apparatus of claim 10 wherein said developer means includes an elongated magnet assembly, a tubular sleeve formed on a non-magnetic material positioned about said magnet assembly and located near said sump and said photoconductor surface;

means for rotating said tubular sleeve;

said magnet assembly arranged for establishing a magnetic field for attracting said developer material to said sleeve in the vicinity of said sump and for establishing a relatively stronger field near said photoconductor surface for causing said developer material to assume a bristle-like configuration in contact with said photoconductor surface.

12. The transceiver apparatus of claim 11 including a second magnet assembly and a second elongated tubular sleeve rotatably positioned about said second magnet assembly and located near said first tubular sleeve, said second magnet assembly arranged for establishing a field for attracting developer material which is carried by said first sleeve from said developing station and for providing a field of reduced intensity near an upper portion thereof whereby carrier particles which are attracted from said first sleeve are transported by said second sleeve to said second position and fall by gravity flow to said reservoir.

13. A facsimile transceiving apparatus comprising:

means for scanning a document and for generating a video signal for transmission to a remote receiving apparatus;

electrostatographic means for reproducing a document, said means including a transport surface, and a photoreceptor surface positioned on said transport surface, means for establishing a uniform electrostatic charge on said photoreceptor surface, means for repetitively scanning a modulated light beam across said photoreceptor surface to form a latent electrostatic image thereon, and means for developing said image; and, a means for selectively advancing said transport surface at one of a plurality of different rates.

14. The apparatus of claim 13 wherein said means for selectively advancing said transport surface is adapted for advancing said transport surface at a predetermined rate during said imaging and development and at a relatively faster rate during image transfer.

15. The transceiving apparatus of claim 13 wherein said means for advancing said transport surface comprises means for maintaining the rate of advance for said transport surface at one of said rates while said photoreceptor surface is being imaged and developed.

16. The transceiving apparatus of claim 15 wherein said means for advancing said transport surface comprises a stepping motor and means for exciting said motor at different rates.

17. The apparatus of claim 16 wherein said transport surface comprises a rotatably mounted tubular shaped body having an outer surface thereof, said photoreceptor surface is positioned on said outer surface and mechanical coupling means are provided for coupling said stepping motor to said tubular body for rotating said transport surface.

18. The transceiving apparatus of claim 13 wherein a charging means is provided for establishing a relatively uniform electrostatic charge on said photoreceptor surface at said different rates of advancement of said transport surface.

19. The transceiving apparatus of claim 18 wherein said charging means comprises a scorotron.

* * * * *

UNITED STATES PATENT OFFICE
CERTIFICATE OF CORRECTION

Patent No. 3,869,569 Dated March 4, 1975

Inventor(s) Peter J. Mason, Gary L. Hutchinson, Lawrence P. Lavery, Vernon E. Punt and Roy W. Rivers It is certified that error appears in the above-identified patent and that said Letters Patent are hereby corrected as shown below:

Column 2, line 31, delete "os" and substitute therefor --is--.
Column 2, line 31, delete "def;ected" and substitute therefor --deflected--.
Column 3, line 53, delete "which is".
Column 6, line 11, after "which", insert "in turn".
Column 6, line 12, after "which", delete "in turn".
Column 7, line 14, after "180", delete "is rotated and" and substitute therefor --clears--.
Column 7, line 28, delete "directin" and substitute therefor --direction--.
Column 7, line 37, delete "suport" and substitute therefor --support--.
Column 7, line 41, delete "90+" and substitute therefor --90°--.
Column 7, line 46, delete "flecting" and substitute therefor --flection--.
Column 9, line 43, delete "rollers" and substitute therefor --roller--.

Column 17, line 49, delete "oriented" and substitute therefor --orientated--.

Signed and sealed this 1st day of July 1975.

(SEAL)
Attest:

RUTH C. MASON
Attesting Officer

C. MARSHALL DANN
Commissioner of Patents
and Trademarks